United States Patent
Dunn et al.

(10) Patent No.: US 10,624,263 B2
(45) Date of Patent: *Apr. 21, 2020

(54) CROP MACHINE WITH AN ELECTRONICALLY CONTROLLED HYDRAULIC CYLINDER FLOTATION SYSTEM

(71) Applicant: MacDon Industries Ltd., Winnipeg (CA)

(72) Inventors: James Thomas Dunn, Winnipeg (CA); Graham Michael Leverick, Winnipeg (CA); Russell George Lyons, Winnipeg (CA); Bruce Robert Shearer, Winnipeg (CA); Kyle Edward Boch, Petersfield (CA)

(73) Assignee: MacDon Industries Ltd, Winnipeg MB (CA)

( * ) Notice: Subject to any disclaimer, the term of this patent is extended or adjusted under 35 U.S.C. 154(b) by 55 days.

This patent is subject to a terminal disclaimer.

(21) Appl. No.: 15/837,670

(22) Filed: Dec. 11, 2017

(65) Prior Publication Data

US 2018/0153101 A1 Jun. 7, 2018

Related U.S. Application Data

(63) Continuation-in-part of application No. 15/188,468, filed on Jun. 21, 2016, now Pat. No. 9,968,033.

(51) Int. Cl.
*A01D 41/14* (2006.01)
*A01D 41/127* (2006.01)
(Continued)

(52) U.S. Cl.
CPC .......... *A01D 41/141* (2013.01); *A01B 63/008* (2013.01); *A01B 63/108* (2013.01);
(Continued)

(58) Field of Classification Search
CPC .... A01D 34/246; A01D 41/127; A01D 41/14; A01D 41/141; A01D 41/142;
(Continued)

(56) References Cited

U.S. PATENT DOCUMENTS

| 4,422,474 A | * | 12/1983 | Basrai | A01B 63/1006 137/625.64 |
| 4,733,523 A | * | 3/1988 | Dedeyne | A01D 75/287 56/10.2 E |

(Continued)

FOREIGN PATENT DOCUMENTS

| DE | 3337789 A1 | * | 4/1984 | |
| DE | 102006004423 A1 | * | 8/2007 | A01B 63/10 |

(Continued)

OTHER PUBLICATIONS

Bosch Rexroth, "Proportional pressure relief valve" brochure, Type DBETX, RE 29161/07.05, Jul. 2005, 12 pages (Year: 2005).*

*Primary Examiner* — Faris S Almatrahi
*Assistant Examiner* — David A Testardi
(74) *Attorney, Agent, or Firm* — Adrian D. Battison; Ade & Company Inc.; Ryan W. Dupuis

(57) ABSTRACT

A header is supported by a pair of hydraulic float cylinders, where a float pressure to the cylinders is directly controlled by an electronic control supplying a variable control signal to a PPRR valve arrangement to maintain the float pressure at a predetermined value. At the set pressure a predetermined lifting force is provided to the header. A position sensor is used to generate an indication of movement and/or acceleration and/or velocity. The electronic control is arranged, in response to changes in the sensor signal, to temporarily change the control signal to vary the lifting force and thus change the dynamic response of the hydraulic float cylinder. A lift force greater than that required to lift the header can be provided by a lift cylinder and can be opposed in a (Continued)

controlled manner to apply a controlled downforce by the back of the same cylinder or by a separate component.

24 Claims, 10 Drawing Sheets

(51) Int. Cl.
*A01B 63/00* (2006.01)
*A01B 63/108* (2006.01)
*A01D 41/12* (2006.01)
*F15B 11/08* (2006.01)
*F15B 13/044* (2006.01)
*F15B 21/14* (2006.01)
*F15B 1/02* (2006.01)
*F15B 11/10* (2006.01)

(52) U.S. Cl.
CPC ........ *A01D 41/127* (2013.01); *A01D 41/1243* (2013.01); *F15B 1/024* (2013.01); *F15B 11/08* (2013.01); *F15B 11/10* (2013.01); *F15B 13/044* (2013.01); *F15B 21/14* (2013.01); *F15B 2211/20546* (2013.01); *F15B 2211/3059* (2013.01); *F15B 2211/30565* (2013.01); *F15B 2211/5151* (2013.01); *F15B 2211/526* (2013.01); *F15B 2211/625* (2013.01); *F15B 2211/6309* (2013.01); *F15B 2211/6313* (2013.01); *F15B 2211/6336* (2013.01); *F15B 2211/6653* (2013.01); *F15B 2211/7051* (2013.01); *F15B 2211/7128* (2013.01); *F15B 2211/761* (2013.01)

(58) Field of Classification Search
CPC .... A01D 41/145; A01B 63/008; A01B 63/10; F15B 11/036; F15B 2211/7053; F15B 2211/3057; F15B 2211/6336
See application file for complete search history.

(56) References Cited

U.S. PATENT DOCUMENTS

| | | | | |
|---|---|---|---|---|
| 4,915,014 A * | 4/1990 | Gilmore | ................ | A01B 63/14 172/311 |
| 5,044,446 A * | 9/1991 | Jonasson | ................ | E02F 3/844 172/4.5 |
| 6,073,431 A * | 6/2000 | Osborne | ................ | A01D 41/16 56/15.7 |
| 6,145,859 A * | 11/2000 | Altherr | ................ | B60G 9/003 280/124.116 |
| 6,901,729 B1 * | 6/2005 | Otto | ................ | A01D 41/145 56/208 |
| 8,033,209 B2 * | 10/2011 | Jessen | ................ | A01B 63/1006 701/50 |
| 2001/0002533 A1 * | 6/2001 | Rhody | ................ | A01B 63/1145 56/10.2 E |
| 2003/0033854 A1 * | 2/2003 | Klik | ................ | F15B 11/028 73/37 |
| 2004/0177749 A1 * | 9/2004 | Joergensen | ........ | A01B 63/1013 91/445 |
| 2004/0194618 A1 * | 10/2004 | Joergensen | ........ | A01B 63/1013 91/471 |
| 2007/0012009 A1 * | 1/2007 | Hoffman | ................ | A01D 41/145 56/10.2 R |
| 2007/0068129 A1 * | 3/2007 | Strosser | ................ | A01D 41/141 56/10.2 E |
| 2007/0277405 A1 * | 12/2007 | Anderson | ............ | E02F 9/2203 37/348 |
| 2007/0277519 A1 * | 12/2007 | Jessen | ................ | F15B 11/028 60/462 |
| 2009/0056531 A1 * | 3/2009 | Jessen | ................ | A01B 63/1006 91/388 |
| 2010/0078185 A1 * | 4/2010 | Carlz | ................ | A01B 63/1006 172/4 |
| 2011/0253239 A1 * | 10/2011 | Graham | ............ | A01B 63/1013 137/613 |
| 2012/0285318 A1 * | 11/2012 | Jessen | ................ | A01B 63/1006 91/403 |
| 2016/0037721 A1 * | 2/2016 | Teach | ................ | A01D 41/145 60/328 |
| 2016/0316611 A1 * | 11/2016 | Fink | ................ | A01B 63/32 |
| 2018/0359920 A1 * | 12/2018 | Dunn | ................ | A01D 41/141 |

FOREIGN PATENT DOCUMENTS

| | | | | |
|---|---|---|---|---|
| DE | 102009031493 A1 * | 1/2011 | | |
| EP | 1281872 A1 * | 2/2003 | ......... | A01B 63/1006 |
| EP | 1672225 A2 * | 6/2006 | | |
| JP | 04179709 A * | 6/1992 | ............ | A01B 63/10 |
| WO | WO-2005005842 A1 * | 1/2005 | ............ | A01B 63/10 |

* cited by examiner

CROP MACHINE WITH AN ELECTRONICALLY CONTROLLED HYDRAULIC CYLINDER FLOTATION SYSTEM

This application is a continuation in part application of application Ser. No. 15/188,468 filed Jun. 21, 2016.

This invention relates to crop machine with an electronically controlled hydraulic cylinder flotation system of the header on support tractor. In particular the arrangement provides firstly a construction in which the effect of static friction provided by cylinder seals is significantly reduced so as to reduce resistance to motion of the cylinder in the floating action. Secondly the arrangement herein provides a dynamic control system which modifies the forces applied by the cylinder in response to movement of the header relative to the tractor. The present invention can be used in many different engaging systems such as hay tools, rakes, pickups, etc but is particularly applicable both for swathers or windrowers where the header is carried on a swather tractor and for combine harvesters where the header is carried by a combine adapter connected to the feeder house. If used for cutting crop for harvesting, the header can use different cutting systems including sickle bars and rotary mowers or like cutting arrangements.

BACKGROUND INFORMATION

Most windrowers on the market all have some type of hydraulic header flotation. These types of flotation systems suspend the header from the windrower so that there remains a small percentage of the header mass supported by the ground. The advantages to these types of hydraulic float systems include the ability to easily adjust to a wide range of header weights/types, full adjustability of flotation system from the cab, few moving parts, compact, has built in dampening effects and is well received in the market.

However, due to internal friction of the cylinder seals of the flotation cylinders, these systems typically have poor ground following capabilities unless the mass supported by the ground is significant, in the order of 15% of the header mass. With this level of ground pressure (mass of header carried by the ground), wear on the ground contacting components is significant. Also, when hitting an obstacle, a higher ground pressure is undesirable.

In the traditional hydraulic float systems, the header float cylinders are each connected to a respective accumulator, pressure sensor and pressure control valve. The pressure control valves are in turn connected to a hydraulic pressure source such as a load sense pump. The controller receives input signals from the pressure sensors and makes adjustments to the pressure control valves to maintain a known pressure in the accumulator/cylinder circuit. The accumulator/cylinder system acts much like a spring so that when the header hits an obstacle and needs to go over the obstacle, the accumulator supplies pressure and flow to the cylinder to aid the movement of the header. When the header needs to go down into a ditch or low spot, the float cylinder drives oil back into the accumulator.

MacDon has traditionally maintained a coil spring flotation system that does not have the same friction limitations and typically has better ground following capabilities. A typical MacDon spring flotation system can achieve ground pressure in the order of 10% of the header mass while still having acceptable ground following capabilities. The spring flotation systems are currently used on MacDon windrowers and combine adapters.

Header flotation systems typically use a fluid circuit including an accumulator, hydraulic cylinders, and control valves to perform the flotation function. The vehicles may have a single hydraulic cylinder, or one on each side of the header, to perform both a lift and flotation function, or they may have separate hydraulic cylinders for the lift and flotation functions with the capability of independently adjusting the flotation force for each side of the header. Typically the operator selects the desired flotation setting by actuating rocker switches; wherein one switch position reduces header contact force with the ground, and another position increases header contact force with the ground. Once the flotation setting is selected, the control valves will return to this preset flotation condition whenever the flotation mode is selected, regardless of subsequent header lift and lower operations.

One aspect of the operator selected flotation setting is that it determines how quickly the header returns in a controlled acceleration or controlled "fall" to its terrain contact position after rising in response to contact with an elevated feature of the terrain. If the header falls too slowly, regions of the field may not be cut at the desired height. If the header falls too rapidly, however, the header may impact or ride roughly over the ground, thereby resulting in undesirably harsh or jarring ride characteristics. It is also possible that the header could impact the ground in some conditions, such as uneven terrain, with sufficient force to result in damage to the header and/or the crop. Typically, an operator's flotation setting will be a function, at least in part, on the ground speed of the vehicle. As a general rule, when traveling over a field of uneven terrain at a relatively low speed, terrain following can be achieved at slower header accelerations, compared to a higher speed. Thus, for travel at lower speeds, an operator would likely use a flotation setting to allow the header to fall more slowly than that selected for a higher speed.

SUMMARY OF THE INVENTION

According to a first definition of the invention there is provided a crop machine comprising:

a support vehicle for running over ground in a direction of forward movement;

a frame having at least a first frame section and a second frame section;

each of the first and second frame sections having a crop component including a crop engaging system and at least one ground engaging component for providing a supporting force from the ground;

the first frame section being pivotally connected to the second frame section about an axis generally parallel to the forward direction for upward and downward pivotal movement of the second frame section relative to the first frame section;

a first support apparatus for supporting first frame section from the vehicle so that a proportion of a supporting force to counterbalance the weight of the crop component is supplied by a lifting force from the support apparatus and a remaining portion is supplied by the ground engaging component caused by ground pressure on the ground;

the first support apparatus being arranged for supporting the crop component for upward and downward floating movement of the first frame section relative to the vehicle, the first support apparatus comprising at least one first hydraulic float cylinder and a first hydraulic system containing a hydraulic fluid under pressure;

a second support apparatus for supporting the second frame section from the first frame section so that a proportion of a supporting force to counterbalance the weight of the crop component on the second frame section is supplied by a lifting force from the first frame section and a remaining portion is supplied by the ground engaging component of the second frame section caused by ground pressure on the ground;

the second support apparatus being arranged for supporting the crop component for upward and downward floating movement of the second frame section relative to the first frame section, the second support apparatus comprising at least one second hydraulic float cylinder and a second hydraulic system containing a hydraulic fluid under pressure;

and an electronic control system for supplying a control signal for varying the pressure of a least the first hydraulic system and receiving communication from at least one communication sensor at said second support apparatus such that said pivotal movement of the second frame section relative to the first frame section changes the pressure in the first hydraulic system.

According to a second definition of the invention there is provided a crop machine comprising:

a support vehicle for running over ground in a direction of forward movement;

a frame having at least a first frame section and a second frame section;

each of the first and second frame sections having a crop component including a crop engaging system and at least one ground engaging component for providing a supporting force from the ground;

the first frame section being pivotally connected to the second frame section about an axis generally parallel to the forward direction for upward and downward pivotal movement of the second frame section relative to the first frame section;

a first support apparatus for supporting first frame section from the vehicle so that a proportion of a supporting force to counterbalance the weight of the crop component is supplied by a lifting force from the support apparatus and a remaining portion is supplied by the ground engaging component caused by ground pressure on the ground;

the first support apparatus being arranged for supporting the crop component for upward and downward floating movement of the first frame section relative to the vehicle, the first support apparatus comprising at least one first hydraulic float cylinder and a first hydraulic system containing a hydraulic fluid under pressure;

a second support apparatus for supporting the second frame section from the first frame section so that a proportion of a supporting force to counterbalance the weight of the crop component on the second frame section is supplied by a lifting force from the first frame section and a remaining portion is supplied by the ground engaging component of the second frame section caused by ground pressure on the ground;

the second support apparatus being arranged for supporting the crop component for upward and downward floating movement of the second frame section relative to the first frame section, the second support apparatus comprising at least one second hydraulic float cylinder and a second hydraulic system containing a hydraulic fluid under pressure;

wherein the first and second lift pressure systems include a common accumulator such that downward flexing of the second frame section forces additional fluid into the cylinder of the first hydraulic system to apply additional lift pressure to the first frame section and such that upward flexing of the second frame section removes fluid from the cylinder of the first hydraulic system to apply reduced lift pressure to the first frame section;

and an electronic control system for supplying a control signal for varying the pressure of a least the first hydraulic system.

The arrangement as set out in any of the definitions herein can be constructed so that the electronic control system receives communication from both the first support apparatus and the second support apparatus for varying the pressure of both the first and second hydraulic systems.

The arrangement as set out in any of the definitions herein can be constructed so that the communication sensor comprises a movement sensor responsive to movement of the second support system.

The arrangement as set out in any of the definitions herein can be constructed so that the first and second hydraulic float cylinders cooperate with respective first and second valve arrangements arranged to change a pressure in a chamber of the respective cylinder to provide a required variable lift force.

The arrangement as set out in any of the definitions herein can be constructed so that the valve arrangement has the characteristic that the valve arrangement acts to maintain the pressure of the hydraulic fluid in the chamber at a constant value, which value is dependent on a control signal applied to the valve arrangement, during changes in volume of the chamber caused by movement of the piston.

The arrangement as set out in any of the definitions herein can be constructed so that the electronic control system, to make said temporary changes, is programmed to be responsive to a movement signal from a movement sensor and not to changes in pressure in the chamber which changes are caused by movement of the piston.

In one preferred arrangement, the first hydraulic system comprises a first lift pressure system arranged to apply a pressure to a side of the piston in said at least one first cylinder in a direction to lift the crop component where the pressure defines a lifting force greater than a required lifting force and a first down pressure system for applying a down pressure in a direction to lower the crop component and to apply said ground pressure on the ground and the second hydraulic system comprises a second lift pressure system arranged to apply a pressure to a side of the piston in said at least one second cylinder in a direction to lift the crop component where the pressure defines a lifting force greater than a required lifting force and a second down pressure system for applying a down pressure in a direction to lower the crop component and to apply said ground pressure on the ground.

The arrangement as set out in any of the definitions herein can be constructed so that the first and second lift pressure systems include a common accumulator such that downward flexing of the second frame section forces additional fluid into the cylinder of the first hydraulic system to apply additional lift pressure to the first frame section and such that upward flexing of the second frame section removes fluid from the cylinder of the first hydraulic system to apply reduced lift pressure to the first frame section.

While the arrangement herein can be used on many different types of machine, the construction is particularly designed for use where first frame section comprises a center section attached to the vehicle and the second frame section comprises one of a pair of wing sections and where the vehicle comprises a combine harvester and the crop component includes a cutter for cutting a standing crop.

According to a further definition of the invention there is provided a crop machine comprising:
- a support vehicle for running over ground;
- a crop component including a crop engaging system and at least one ground engaging component for providing a supporting force from the ground;
- a support apparatus for supporting the crop component relative to the vehicle for upward and downward floating movement of the crop component so that a proportion of a supporting force to counterbalance the weight of the crop component is supplied by a lifting force from the support apparatus and a remaining portion is supplied by the ground engaging component caused by ground pressure on the ground;
- the support apparatus comprising:
  - at least one hydraulic float cylinder having a piston movable in the cylinder arranged such that movement of the piston relative to the cylinder causes said lifting force to be applied to the crop component;
  - a hydraulic system containing a hydraulic fluid under pressure for applying a pressure to a side of the piston in said at least one cylinder in a direction to lift the crop component;
  - the hydraulic system in operation being arranged to provide a pressure defining a lifting force greater than a required lifting force;
  - and a down pressure system for applying a down pressure to the crop component in a direction to lower the crop component and to apply said ground pressure on the ground;
  - wherein the down pressure system includes an electronic control system for supplying a control signal so as to vary the down pressure.

While in some cases the hydraulic system in operation is arranged to provide a pressure defining a lifting force greater than a required lifting force, it is also possible that the lifting force may be less which would leave some of the header weight carried by the ground. As long as this weight is less than the final desired ground force.

Typically the crop machine is a harvesting header which is mounted on a combine harvester but many other crop machines can use the system set out herein. The ground engaging system is typically a skid member which runs over the ground so as to keep the cutter bar as close to the ground as possible, but other arrangements can be used where the cuter bar is held raised.

Preferably the electronic control system operates on the down pressure system and not on the hydraulic system so that any changes in pressure in the hydraulic system are caused by movement of the system and not by changes in the control signal. That is the down pressure system is independent of the hydraulic system so that the hydraulic pressure remains in effect unchanged although changes can occur due to movement of the cylinder forcing fluid into and out of the cylinder. Typically an accumulator is provided in the hydraulic circuit so as to take up the flow in fluid. That is the pressure from said hydraulic system is not varied in response to said sensor signal.

In some cases changes are made to the pressure using the position sensor signal and pressure sensor signal but ONLY to maintain the correct pressure in the bottom accumulator to compensate for leakage, temperature changes etc. That is the system does not make changes in this pressure in order to effect changes in the ground pressure based on header movement.

In order to operate the electronic control system, preferably there is provided a sensor arranged to provide a sensor signal to the electronic control system in response to movement of the crop component in the upward and downward floating movement of the crop component, the electronic control system being arranged in response to the sensor signal to temporarily change the control signal to temporarily change the down pressure and subsequently in response to said sensor signal to revert to a set value of the down pressure. That is preferably the electronic control system is arranged in response to changes in said sensor signal to temporarily change the control signal to vary the down force of the down pressure system in response to detected movement of the crop component.

Preferably the electronic control system is arranged to vary the pressure such that the lifting force from the support apparatus is reduced, in order to apply an increased ground force, both when the crop component floats upwardly from an intermediate float position and when the crop component floats downwardly from the intermediate float position.

In addition, preferably the electronic control system and said sensor are arranged in response to said signal to generate a value indicative of acceleration and/or velocity of the crop engaging system in said upward and downward floating movement of the crop component and to vary the control signal in response to the value of acceleration and/or velocity.

In a preferred arrangement, the down pressure system is arranged to vary pressure in a down pressure hydraulic system where hydraulic fluid from the down pressure hydraulic system is applied to the cylinder on a reverse face of the piston so as to oppose the lift pressure from the hydraulic system.

In another alternative, the down pressure system comprises a component separate from the cylinder arranged to apply a down force to a lift linkage in a direction to oppose a force from the piston in the cylinder generated by the pressure from the hydraulic system. This can be another cylinder or a gas bag where the separate component is arranged to generate said down force in response to a pressure in a fluid.

According to a further definition of the invention there is provided a crop machine comprising:
- a support vehicle for running over ground;
- a crop component including a crop engaging system and at least one ground engaging component for providing a supporting force from the ground;
- a support apparatus for supporting the crop component so that a proportion of a supporting force to counterbalance the weight of the crop component is supplied by a lifting force from the support apparatus and a remaining portion is supplied by the ground engaging component caused by ground pressure on the ground;
- the support apparatus being arranged for supporting the crop component for upward and downward floating movement relative to an intermediate float position of the crop component;
- the support apparatus comprising:
- at least one hydraulic float cylinder;
- a hydraulic system containing a hydraulic fluid under pressure;
- an electronic control system for supplying a control signal so as to vary the pressure;
- the electronic control system being arranged to vary the pressure such that the lifting force from the support apparatus is reduced both when the crop component floats upwardly from said intermediate float position and when the crop component floats downwardly from said intermediate float position.

Preferably, in addition, the electronic control system and the sensor are arranged in response to the signal to generate a value indicative of acceleration and/or velocity of the crop engaging system in said upward and downward floating movement of the crop component and to vary the control signal in response to the value of acceleration and/or velocity.

The intermediate position can be defied by a point or a small zone but in some cases the intermediate position includes a region on each side of a point in which region the lifting force is maintained constant.

In some cases the rate of reduction of the lifting force on one side of the intermediate point is different from that on the other side. That is the rate of reduction of the lifting force as the crop component moves upwardly can be greater than that when the crop component moves downwardly.

In some cases the reduction of the lifting force is directly or linearly proportional to the distance moved. However more complex algorithms can be used to vary the lifting force in relation to the distance moved by the crop engaging component.

More specifically the arrangement disclosed herein can provide a crop machine comprising:

a support vehicle for running over ground to be harvested;

a crop component including a crop engaging system and at least one ground engaging component for providing a supporting force from the ground;

a support apparatus for supporting the crop harvesting component from the vehicle for upward and downward floating movement of the crop harvesting component so that a part of a supporting force is supplied by the support apparatus and a part supplied by the ground engaging component;

the support apparatus including at least one hydraulic float cylinder arranged such that application of a hydraulic fluid under hydraulic pressure to said at least one float cylinder causes a lifting force to be applied to the crop harvesting component by movement of said at least one float cylinder which lifting force is proportional to said hydraulic pressure;

said at least one float cylinder comprising cylinder seals over which one component of said at least one float cylinder slides relative to another component of said at least one float cylinder;

a source of hydraulic fluid for supply of the hydraulic fluid to said at least one float cylinder at a pressure greater than said hydraulic pressure;

a return for said hydraulic fluid;

a valve arrangement for controlling a flow of and pressure of said hydraulic fluid from said source to said at least one float cylinder;

the valve arrangement being connected to said at least one float cylinder such flow of fluid into and out of said at least one float cylinder is controlled by the valve arrangement at said hydraulic pressure controlled by the valve arrangement;

an electronic control system for supplying a control signal to the valve component to change said predetermined pressure in dependence on a value of the signal;

said valve arrangement comprising:
a first connection to said source;
a second connection to said at least one float cylinder
a third connection for discharge of said hydraulic fluid to said return;
and a valve component operable to control flow of hydraulic fluid from said source to said at least one float cylinder and flow of hydraulic fluid from said at least one float cylinder to said return so as to maintain said hydraulic pressure in said at least one float cylinder at a predetermined pressure set in dependence upon said control signal from said control system;

and an arrangement for causing relative reciprocating movement in an alternating wave pattern between said one component of said at least one float cylinder and said another component of said at least one float cylinder.

The objective is that preferably the alternating wave pattern has an amplitude sufficient to cause the seals to break free from static frictional engagement with the component so as to maintain movement between the components at said cylinder seals to reduce static friction. The amplitude necessary to achieve this can vary in accordance with pressures in the cylinder and weight of the header and can be readily determined by a person skilled in the art. The seal or seals concerned are typically those at the cylinder wall at the piston head and/or the cylinder head at the piston rod. In some cases cylinders can be used where there is no seal at the rod. Other constructions can also of course be provided. The action in which the seal breaks free from the other component may need actual movement of the seal along the surface or may need only a flexing of that seal so that its surface breaks away from contact with a fixed portion of the surface of the component. In any event it can be determined that the amount of force required to cause movement of the components in response to a control signal can drop to a figure as much as of the order of 10% of the normal value where the alternating signal is not applied.

Preferably the alternating wave pattern has a frequency in the range 5 to 15 Hz

Preferably the relative reciprocating movement is provided by an alternating wave pattern signal applied by said electronic control system said valve arrangement to change said predetermined pressure in dependence on a value of the signal. However the movement can be obtained by changes in the pressure of the fluid applied to the cylinder applied to the fluid by a component different from the valve. Various sources for the changes in the pressure can be obtained including mechanical components. Also other components on the header which generate a fluid pressure can be used to provide an alternating fluid pressure.

The pattern can typically be sinusoidal but other shapes can also be used.

As the alternating wave pattern is used at a situation where the header may remain stationary for a period of time such as during a floating action where no ground changes occur, the alternating wave pattern can be halted when the cylinder is used in a lifting or lowering state at which time the cylinder is of course continually moving. This avoids the necessity for calculations to extract the waveform from the sensing systems when the waveform is not required.

Yet further the arrangement disclosed herein can provide a crop machine comprising:

a support vehicle for running over ground;

a crop engaging component including a crop cutter system and at least one ground engaging component for providing a supporting force from the ground;

a support apparatus for supporting the crop harvesting component from the vehicle for upward and downward floating movement of the crop harvesting component so that a predetermined proportion of a supporting force is supplied by the support apparatus and a remaining portion is supplied by the ground engaging component;

the support apparatus including at least one hydraulic float cylinder arranged such that application of a hydraulic fluid under hydraulic pressure to said at least one float cylinder causes a lifting force to be applied to the crop harvesting component by movement of said at least one float cylinder which lifting force is proportional to said hydraulic pressure;

a source of hydraulic fluid for supply of the hydraulic fluid to said at least one float cylinder at a pressure greater than said hydraulic pressure;

a return for said hydraulic fluid;

a valve arrangement for controlling a flow of and pressure of said hydraulic pressure from said source to said at least one float cylinder;

the valve arrangement being connected to said at least one float cylinder such flow of fluid into and out of said at least one float cylinder is controlled by the valve arrangement at said hydraulic pressure controlled by the valve arrangement;

an electronic control system for supplying a control signal to the valve component to change said predetermined pressure in dependence on a value of the signal;

said valve arrangement comprising:
a first connection to said source;
a second connection to said at least one float cylinder
a third connection for discharge of said hydraulic fluid to said return;
and a valve component operable to control flow of hydraulic fluid from said source to said at least one float cylinder and flow of hydraulic fluid from said at least one float cylinder to said return so as to maintain said hydraulic pressure in said at least one float cylinder at a predetermined pressure set in dependence upon said control signal from said control system;

a sensor arranged to provide a sensor signal to said electronic control system in response to movement of the crop harvesting component in said upward and downward floating movement of the crop harvesting component;

said electronic control system being arranged to provide a set value of said control signal to provide said lifting force at a set value to maintain said predetermined proportion of said supporting force;

said electronic control system being arranged in response to said sensor signal to temporarily change the control signal to temporarily change the lifting force.

Preferably the electronic control system is arranged subsequent to the temporary change, in response to said sensor signal, to revert to the set value. In this way, preferably, the electronic control system is arranged in response to changes in said sensor signal to temporarily change the control signal to vary the lifting force and thus change the response of the hydraulic float cylinder in response to detected movement of the crop harvesting component.

For example the electronic control system is arranged upon detection of an end of the acceleration in said upward floating movement to change the control signal to decrease the lifting force to dampen the upward movement.

In this way the control system can be used to increase or to decrease the lifting force dynamically during the time that the header is being lifted by contact with the ground or another obstacle so as to improve the response to forces from ground contact. In addition as soon as the ground contact is removed thus halting any further acceleration, the lifting force can be significantly reduced so that the weight of the header is re-applied in the downward direction thus damping any further upward floating movement. This avoids or reduces the situation where the header is lifted by ground force or engagement with an obstacle and then remains lifted for an extended period of time thus interfering with the cutting of the crop while the header remains raised.

It will be appreciated that the dynamic control of the lifting forces depending upon the movement of the header can be used both in a ground flotation mode and also when cutting at a set raised height. In the latter condition, float action is typically provided in order to float the header over any obstacles, even though the main cutting action is at the raised position from the ground. Also in some cases such as ditches and mounds the ground height may vary sufficiently that the header engages the ground even though nominally set at a height above the ground. In all of these cases, therefore, the dynamic control of the lifting forces increases the available force to lift the header over the change in height of the ground or over the obstacle. At the same time the lifting action is halted or reduced when the obstacle is cleared so as to reduce the time that the header remains elevated above the required condition.

In a situation where the header is at a raised cutting height, the downward forces can also be dynamically controlled to most effectively return the header to the required cutting height. Thus the downward forces may be increased at the beginning of the downward movement and may be reduced toward the end of the downward movement to bring the header more smoothly back to its required height.

In order to provide the best damping force, preferably the electronic control system is arranged to change the control signal to decrease the lifting force to a value less than said set value. The header will therefore accelerate downwardly in view of this reduced lifting force until the header reaches the ground whereupon the downward acceleration is halted and the control system reapplies the set value. In a symmetrical manner, preferably the electronic control system is arranged upon detection of acceleration in the downward floating movement to change the control signal to decrease the lifting force to assist the acceleration in said downward floating movement. That is, when the header has been riding on the ground with no float required, and when a dip in the ground requires that the header fall to the lower ground level, the lifting force can be rapidly decreased so as to assist the downward movement of the header using the weight from the header. Also the electronic control system can be arranged upon detection of an end of said acceleration in said downward floating movement, that is the header has re-engaged with the ground, to change the control signal to increase the lifting force to dampen said downward movement.

Preferably the sensor comprises a position sensor for generating a position signal indicative of a position of the cylinder in its movement and the electronic control system is arranged to calculate from the position signal a velocity and acceleration of the crop harvesting component. However other sensor arrangements may be provided including for example a specific acceleration detection device and a specific relative movement detection device, all of which senses are now readily available in effective and inexpensive form due to their wide usage in other areas.

Preferably the electronic control system is therefore arranged to achieve a comprehensively adjustable spring rate for the dynamics of the flotation system.

Preferably the electronic control system is therefore arranged to achieve comprehensively adjustable damping for the dynamics of the flotation system.

In this invention, the electronic control system can be arranged to achieve comprehensively adjustable flotation system dynamics based on operating state of the implement including but not limited to implement height, ground speed and changes in terrain (incline angle, etc)

in additional preferably the electronic control system can be arranged to allow for the operator to select from preset flotation system dynamics which can be tailored to different field conditions and implements.

In order to take advantage of the benefits of a hydraulic flotation system, the arrangement herein provides a system that reduces the effect of the friction in the flotation system to provide excellent ground following capabilities. This system may be applied to windrowers and combine adapters or any other agricultural implement that is floating suspended from carrier (hay tools, rakes, pickups, etc). The system can be used when floating a header that is cutting on the ground as well as a header that is cutting at a height above ground level. While the system is particularly applicable to the main header float at the front of the tractor, the same construction can also be used for the wing float on a flex draper header of the type shown in U.S. Pat. No. 5,005,343 (Patterson) issued 9 Apr. 1991, the disclosure of which is incorporated herein by reference.

The system herein comprises one or more float cylinders that are used to suspend the header from the carrier. At (or near) each cylinder is an electronically controlled proportional pressure reducing relieving (PPRR) valve that controls the pressure at that cylinder. The valve is controlled by an electronic controller that takes pressure (or force) and position/velocity/acceleration feedback from the float system and varies the pressure in the cylinder to obtain prescribed float characteristics. A hydraulic pressure and flow is supplied to the valve from a source, that could be an accumulator charged to more than the maximum pressure demanded by the float system, a drive circuit that has a minimum pressure that is more than the maximum pressure demanded by the float system, or some other hydraulic source. However the pressure from the valve is applied directly and immediately to the cylinder without the presence of an accumulator in the circuit which would otherwise dampen the action of the pressure on the cylinder.

That is while most systems have an accumulator hydraulically connected directly to the cylinder in float mode, the present arrangement uses an electronically controlled PPRR valve directly between the pressure source and the float cylinder. This allows the system to have very precise, instantaneous control of the float cylinder pressure so that it can adjust the pressure based on instantaneous changes of the float system. The accumulator systems are far less precise/responsive since a change of hydraulic pressure, when commanded, is split between cylinder movement and accumulator charge).

Each float cylinder has a respective position sensor, pressure sensor and pressure reducing relieving valve. The valve is then coupled to a pressure source. The controller receives input from the sensors and controls each PPRR valve independently based on these input signals. The signal from the position sensor may be directly linked to the cylinder or may be linked to some other float link(s) that indicate header position. This signal can be used to calculate in the electronic control system velocity and acceleration of the header as well as header position in the float range. The PPRR valves directly control the cylinders with no accumulator between the valve and the cylinder. This is the simplest representation of the system.

In another improvement of the invention that adds an accumulator, pressure sensor and control valve to enhance the response of the float system. The controller receives an input signal from the pressure sensor and controls the valve to maintain a pressure range in the accumulator that is some value higher (200-250 psi for example) than the maximum pressure demanded at pressure sensors. This maximum pressure is dependent on header weight and can be determined via calibration using conventional methods where the lifting force is increased gradually until the header just lifts from the ground and by adding a predetermined value to that detected value, or by stored values based on header ID for each header size and type.

With this method, the accumulator can supply instantaneous flow to the PRR valves likely more quickly than the load sense pump can respond to the demand of flow.

Note that this type of float system may also be used to float the wings on a flex header. Using a cylinder to react the weight of the wing near the wing pivot and controlling that cylinder with the proposed system.

In addition to the above, the electronic control algorithms include a method of controlling the output to the proportional PRR valve controlling the cylinder pressure, to encourage the header to follow the ground more effectively.

Part of the electronic control that we use involves applying an oscillating control signal to the PPRR valve that supplies float pressure to the cylinder. This creates a varying pressure in the cylinder that causes the cylinder to oscillate slightly. In doing so, the cylinder is always in motion and this reduces the friction effect of the cylinder seals. This oscillation of the pressure also helps to compensate for the hysteresis or dead band of the proportional pressure reducing/relieving valve. This type of valve includes a spool oscillating back and forth between input and output fluid positions to maintain the pressure at a position determined by the signal to the solenoid of the valve where the position of the spool is controlled by a pilot connection to the output pressure line. Typically the pilot connection is internal to the valve itself and does not require a duct to the output line or to the controlled cylinder. This type of valve has a dead band between where it relieves pressure and where it reduces pressure.

A further feature of the system is that the system provides a programmable spring rate or float decay that can be customized to a variety of float requirements such as cutting height, ground speed, soil conditions etc. This spring rate can instantaneously and continually be adjusted based on sensor inputs from the float system, operator or other systems such as radar, sonar or laser detection of obstacles and ground contours.

A further feature of the system includes the ability to have adjustable dampening of the float system, again based on float requirements or situations.

Another feature involves the increase or decrease of float cylinder pressure based on float position and direction of movement. For example, this allows us to decrease the float pressure if the header is detected to be moving down (while cutting through a ditch for example) so that the header will follow the ground as the ground drops away. A similar adjustment can be made to increase or decrease the float pressure if the header is detected to be moving up over a mound.

Another feature involves the increase or decrease of float cylinder pressure based on header velocity and/or acceleration.

Other features of the invention provide:

-a- Oscillating float pressure to reduce effects of proportional PRR valve hysteresis as well as system (mechanical) and cylinder seal friction.

-b- Sensing change in float position/last travel direction/velocity (this can be done with sensors measuring cylinder length, float link position etc) and then decreasing/increasing float pressure to make the header fall faster or raise faster.

-c- Different float characteristic settings based on ground condition, ground speed, crop, cutting on/off the ground.

-d- Programmed spring rate.

Feedback from a pressure sensor may not necessarily be required as the system may be able to just use the output to the PWM valve. For example, the valve output pressure can be correlated to valve electronic input so technically, if we send the valve a known signal, we can know what output pressure the valve is set to. However typically the pressure sensor may be required due to changes in valve characteristics due to temperature changes, wear, vibration etc which may be too large to make this viable.

The signal from the pressure sensor can be used as a feed back to confirm that the valve is indeed outputting the required output pressure as set by the control signal. Thus it may be possible to provide an arrangement in which the feedback is used only periodically to check the output value so that the signal from the pressure sensor is not directly and repeatedly used by the control system. That is, periodically the output pressure can be checked and a correction factor used in subsequent calculations by the control system, if it is found that the measured output pressure does not match the intended value as set by the control device.

As an alternative, an arrangement can be made to work where the system knows the position of the header in the float range (from the position sensors) and can use this knowledge to make changes to the float pressure to find an optimum value that places the header with a minimal ground force based on velocity and acceleration calculations.

While the alternating wave movement is preferably provided by a wave form in the signal from the control device, it also possible to use an alternative method in which a mechanical version of dithering such as a piston/crank arrangement that oscillates the float pressure. For example in a sickle cutter the system could use the pulsing of the knife drive circuit as well.

Various methods of obtaining float supply pressure can be used including drive circuit pressure, drive circuit pressure with an accumulator and check valves, closed loop load sense pump.

Calibration is typically carried out by the conventional method in which the system is operated to increase float pressure until header just leaves the ground and then use the system to increase/decrease float pressure to get optimum ground contact pressure. Other calibration methods can of course be used, many of which are known to persons skilled in the art.

Preferably in the embodiments or aspects defined above, it will be to noted that the valve arrangement has the characteristic that the valve arrangement acts to maintain the pressure of the hydraulic fluid in the chamber at a constant value, which value is dependent on a control signal applied to the valve arrangement, during changes in volume of the chamber caused by movement of the piston.

Preferably in the embodiments or aspects defined above, it will be noted that the electronic control system, to make said temporary changes, is programmed to be responsive to the movement signal and not to changes in pressure in the chamber which changes are caused by movement of the piston. Such as system is not practical with the valve type used herein because the valve acts to maintain the cylinder pressure constant until the control signal requiring a change in the pressure is calculated. Thus there is no change in pressure to be detected.

While the valve is thus intended to and operates to keep the pressure constant despite movement of the piston in the cylinder changing the volume of the chamber, the system may include a feedback sensor to ensure that the set pressure is maintained without unacceptable drift. However this feedback sensor is not used in the calculation of the required pressure and thus the required control signal matching that required pressure.

As explained in more detail hereinafter, the chamber of the cylinder to which the controlled pressure is applied by the valve arrangement can be on the lift side of the piston so that increases in pressure act to increase the lift force or more preferably the controlled pressure is applied by the valve arrangement in a direction such that increases in pressure act to decrease the lift force. Typically this is applied on the down force side of the piston to counterbalance a generally constant lift force from an accumulator applied to the lift side of the piston.

Another feature of the invention is that when the electronic control system operates on the down pressure system it takes into account changes in pressure in the lift pressure system caused by movement of the piston.

According to another aspect of the invention there is provided a combine harvester comprising:

a support vehicle for running over ground, the vehicle having a feeder house for receiving a harvested crop;

a header including a crop cutting system and at least one ground engaging component for providing a supporting force from the ground;

a support apparatus located between the feeder house and the header for supporting the header so that a proportion of a supporting force to counterbalance the weight of the crop component is supplied by a lifting force from the support apparatus and a remaining portion is supplied by the ground engaging component caused by ground pressure on the ground;

the support apparatus being arranged for supporting the crop component for upward and downward floating movement relative to an intermediate float position of the crop component;

the support apparatus comprising at least one hydraulic float cylinder, a hydraulic system containing a hydraulic fluid under pressure and an electronic control system for supplying a control signal so as to vary the pressure.

BRIEF DESCRIPTION OF THE DRAWINGS

Embodiments of the invention will now be described in conjunction with the accompanying drawings in which.

DETAILED DESCRIPTION

Figure 1:
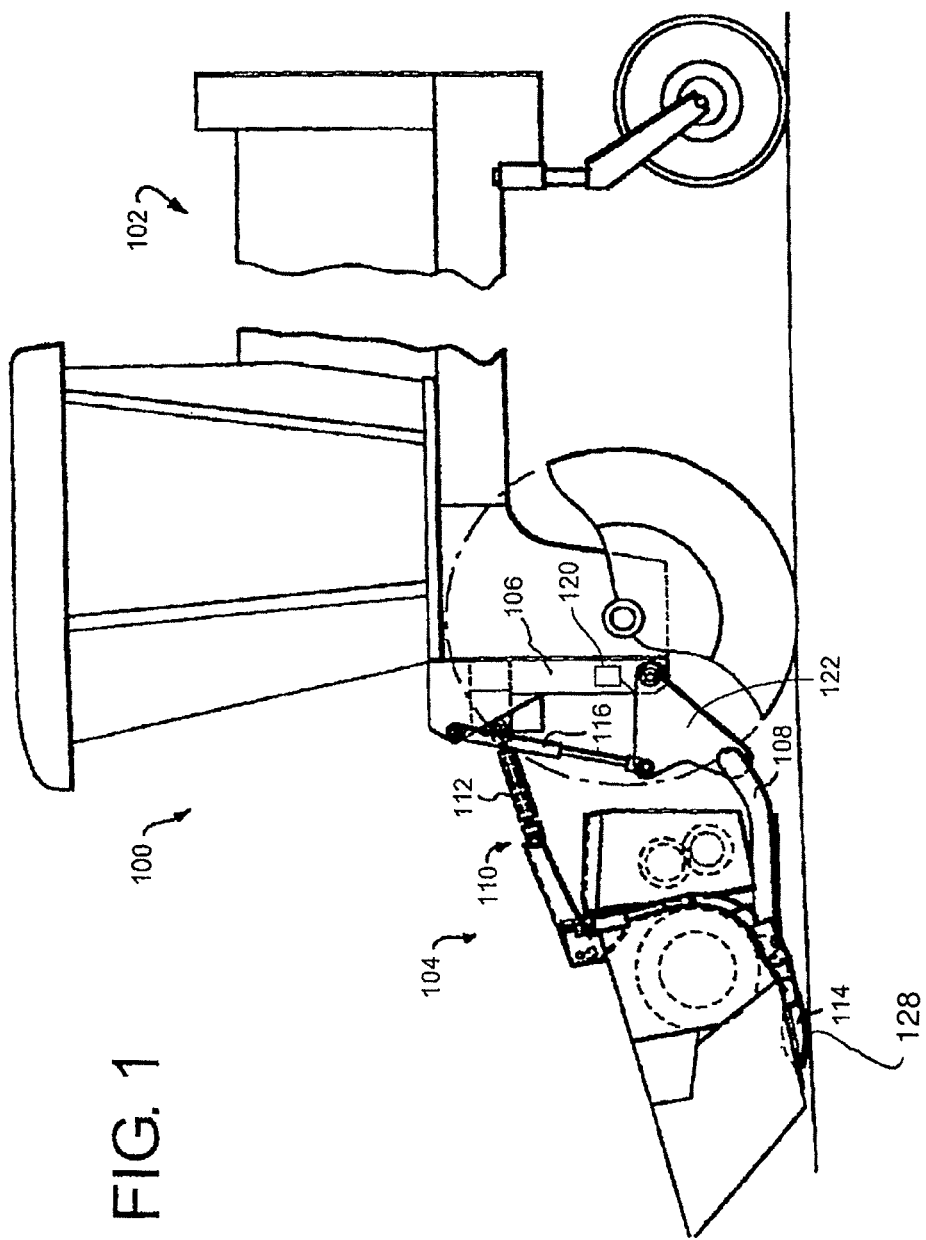
FIG. 1 is a side view of a vehicle having a header and a header flotation system in accordance with the present invention. In this embodiment, the vehicle is a windrower.

FIG. 1 shows the present invention utilized in connection with the self-propelled windrower 100, however, it will be appreciated that the principles of the present invention are not limited to a self-propelled windrower, or to any specific in type of harvesting machine having a header. The figure shows windrower 100, which comprises a tractor 102 and a header 104. The header 104 is pivotally attached to the front end of the frame or chassis 106 of windrower 100 such that it can move up and down with respect to chassis 106.

Such attachment of the header 104 to the frame 106 is achieved through a pair of lower arms 108 (only the left one being shown, the right one being in the same position and in mirror configuration on the right side of the vehicle) pivoted at one end to the frame 106 and at the other end to the header 104 as well as through a central upper link 110.

The link 110 may take the form of a single or double hydraulic cylinder 112 whose extension and retraction is controlled by the operator to remotely control the angle of the sickle bar 114 on the lower front of the header 104.

A single lift/flotation cylinder 116 is shown interconnecting the lower arm 108 to the frame 106. Cylinder 116 supports each side of the header, i.e., each side of the header is supported by its own lift/flotation cylinder 116. Again, only the left side lift/flotation cylinder 116 is shown. The right side lift/flotation cylinder 118 is identically constructed, configured, and arranged as left side lift/flotation cylinder 116 and is interconnected in the identical manner to the header and the frame but is configured in mirror image form to that of the left side of the vehicle.

Figure 1A:
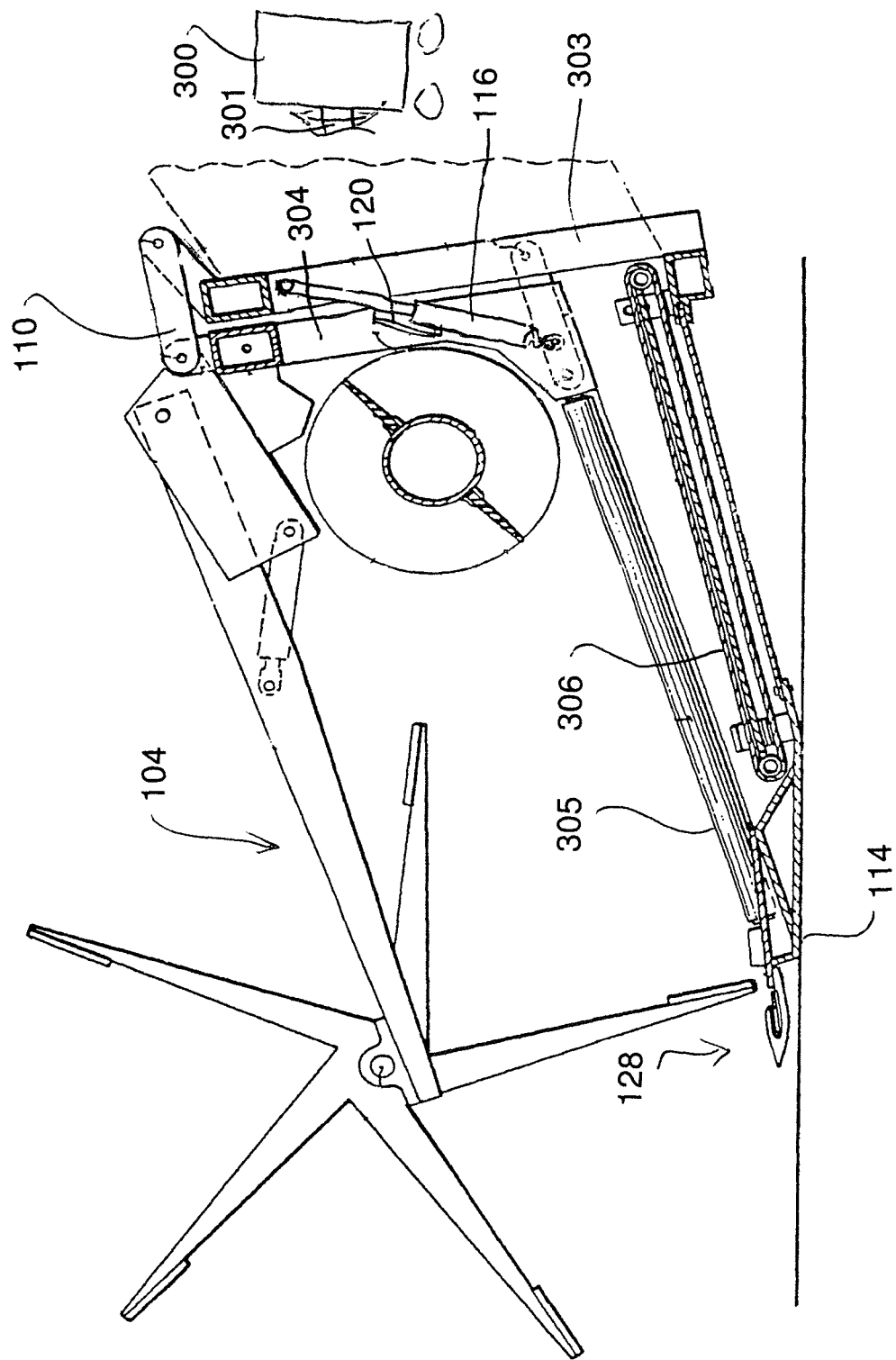
FIG. 1A is a side view of a vehicle having a header and a header flotation system in accordance with the present invention. In this embodiment, the vehicle is a combine harvester.

In FIG. 1A is the same arrangement applied to a combine harvester where the combine tractor is shown at 300 and includes a feeder house 301 which can be raised and lowered so that front end is moved up and down under control of the combine electronics and a height sensor which detects the position of the header 104 relative to the feeder house. A main frame 303 is attached to the feeder house for movement therewith. A header frame 304 is carried on the frame 303 by float cylinders 116 as described herein. Thus the header can float up and down and can twist side to side on the two cylinders 116 each on a respective side of the feeder house. For completeness it will be noted that the header is a draper header with side drapers 305 and a feed draper 306 located behind a cutter bar 128 and a ground engaging skid 114.

In both embodiments a position sensor 120 at a suitable location which can be directly at the cylinder or which is in FIG. 1 coupled to and between frame 106 and bell crank 122 and is configured to sense the position of the cylinder. This can be done at the cylinder or at another location such as at the relative position of bell crank 122 with respect to frame 106. The position sensor shown here is a potentiometer providing a signal which varies when the header moves up and down (has a vertical component of translation) with respect to frame 106. In this sense, the position sensor is also a height sensor which detects the height of the header from the tractor. The particular arrangement of position sensor 120 with respect to frame 106 and with respect to bell crank 122 can be varied depending on the space available, the type transducer desired, and the resolution of the sensor. It will be noted that in this embodiment the bell crank arrangement of the connection between the cylinder 116 and the lift arms 108 acts so that the lift force provided by the lift arms 108 is not directly proportional to the lift force from the cylinder due to changes in mechanical advantage as the movement occurs. This relationship between lift force from the cylinder and actual lift force from the arms on the header must be taken into account in the calculation of a required lift force from the cylinder and thus the pressures to be applied to the cylinder as discussed in detail hereinafter. The arrangement therefore provides a crop machine, typically a crop harvesting machine, comprising the support vehicle 102 for running over ground to be harvested and a crop component, typically a harvesting header 104, including a crop engaging system 114 and at least one ground engaging component or skid plate 128 for providing a supporting force from the ground. The support apparatus 110, 106, 116 and 108 acts to support the crop harvesting header from the vehicle for upward and downward floating movement of the crop harvesting header so that a part of a supporting force is supplied by the support apparatus and a part supplied by the ground engaging component 128.

The support apparatus includes at least one and typically two hydraulic float cylinders 116 and 117 arranged such that application of a hydraulic fluid under hydraulic pressure to the float cylinders 116 and 117 causes a lifting force to be applied to the crop harvesting header by movement of the float cylinder which lifting force is proportional to the hydraulic pressure applied to the cylinder.

The float cylinders include cylinder seals 116A over which the piston component slides relative to the cylinder component of the float cylinder. The circuit 10 applying pressure to the cylinders includes a source 12 of hydraulic fluid for supply of the hydraulic fluid to the float cylinder at a pressure greater than a required hydraulic pressure. The source 12 includes a pump 16 and a drain 14 providing a return for the hydraulic fluid.

The circuit includes two separate sections for supplying fluid under pressure to the respective cylinders 116 and 117, including for each a respective valve arrangement 18, 20 for controlling a flow of and pressure of the hydraulic pressure from the source to the respective cylinders.

As explained previously, the valves are of the PPRR type which include a spool 21 which can slide back and forth within the valve to connect inlet and outlet ports 22, 23 to the line 24 to the respective cylinder. The spool is driven by a solenoid 25 so as to position the solenoid of the valve 18 at a required location to generate a required pressure depending upon a first control signal to the solenoid provided by a controller 28 on a control line 29. A second control signal is provided on the line 29A to the solenoid of the valve 20 which provides the previously stated capability of independently adjusting the lifting force for each side of the header. The spool is also controlled by pilot pressure on line 30 and 31 connected respectively to the inlet and outlet to the valve. Such valves are commercially available from many different suppliers and are known as proportional pressure reducing/relieving valves. These act to maintain the pressure within the cylinder as it supplied along the line 24 at a predetermined value set by the signal on the line 29 from the control system by repeatedly supplying and discharging fluid relative to the cylinder through the ports 22 and 23.

The control signal to the valves is the generated and controlled by and electronic control system in order to change the predetermined pressure in the respective cylinder in dependence on a value of the applied signal.

Thus the valve arrangement includes a first connection 33 to the source 12 and a second connection 34 to the return together with the outlet 24 to the cylinder.

The valve component operates to control flow of hydraulic fluid from the source to the float cylinder and flow of hydraulic fluid from the float cylinder to the return so as to maintain the hydraulic pressure in the float cylinder at a predetermined pressure set in dependence upon the control signal from the control system.

The control system 28 includes a subcomponent 35 which acts to generate an alternating wave signal so as to provide an arrangement for causing relative reciprocating movement in an alternating wave pattern between the piston component of the float cylinder and the cylinder component of the float cylinder so as to maintain movement between the components at the cylinder seals to reduce the effect of static friction.

That is the relative reciprocating movement is provided by the alternating wave pattern signal applied by the electronic control system to the valve arrangement to change the predetermined pressure in dependence on a value of the alternating wave signal.

The subcomponent 35 is controlled by the control system 28 so that the alternating wave pattern is applied only when the cylinder is in float mode and not when the cylinder is used in a lifting or lowering state.

The circuit further includes pressure sensors 40 and 41 which detect the pressure in the fluid supply lines to the cylinders to provide a signal which is communicated to the control system 28. As the valves are arranged to provide the pressure output in response to the control signal supplied, the measurement of the pressure output is not theoretically required. However in view of temperature and other changes which may occur, it is desirable to check the output pressure to ensure that it does not drift over time and the is maintained at the required pressure as determined by the control signal. The feedback check provided by the pressure sensors can be carried out periodically and is not part of the control system operation to generate the output signals.

The position sensors 120 and 121 which detect the position of the cylinders provide a signal which is supplied back to the control system 28. The system may run using only input from the position sensors since the control system 28 can calculate from changes in the signal from the position sensors both the velocity and acceleration of the cylinder and therefore of the header. A suitable algorithm to make such calculations is of course well-known to persons skilled in this art. However in addition to the position sensors or as an alternative thereto, the system may include an accelerometer 42 mounted on the header at one or more suitable locations to provide an output indicative of relative movement of the header and acceleration of the header.

The circuit can further include an operator input 45 which allows the operator to input various parameters as necessary for controlling the control system 28. The control system also includes input lines responsive to various parameters of the operating header including for example a ground speed indicator 46 and a crop condition indicator 47. These are shown only schematically as persons skilled in the art can determine suitable input parameters. A further input line can be provided from a prediction system 48 which can use ground height and crop height sensors to detect in advance and the intended height of the cutting action. The signal can be used to predict obstacles or required changes in cutting height so that the control system can generate suitable signals to raise or lower the cylinders 116, 117 to a required position. It will be appreciated that this input or these inputs to the controller provide in effect a common or general input which determines the required lifting force.

The electronic control system is arranged to provide dynamic control of the lift force applied by the cylinders to the header. Thus, in response to any movement of the header detected by the position sensors or by other accelerometer and relative movement type sensors, the control system can change the pressure applied to the cylinders by the control valves so as to increase or decrease the lifting force from the preset float condition to change the movement of the header.

In this way, for example, upon detection of acceleration in the upward floating movement the control system can act to change the control signal to increase the lifting force to assist the acceleration in the upward floating movement.

Furthermore the electronic control system can act upon detection of an end of the upward acceleration in the upward floating movement to change the control signal to decrease the lifting force to dampen the upward movement. These two dynamic actions can be used for example on impacting an obstacle or on rapid rise in the ground level to rapidly accelerate the header upwardly to clear the ground and then to halt the upward movement by a damping action to cause the header to float back downwardly as quickly as possible. To force the header downwardly more quickly, the electronic control system can act to change the control signal to decrease the lifting force to a value less than the set float value.

Symmetrically, the electronic control system can act upon detection of acceleration in the downward floating movement to change the control signal to decrease the lifting force to assist the acceleration in the downward floating movement and upon detection of an end of the acceleration in the downward floating movement to change the control signal to increase the lifting force to dampen the downward movement.

Figure 3:
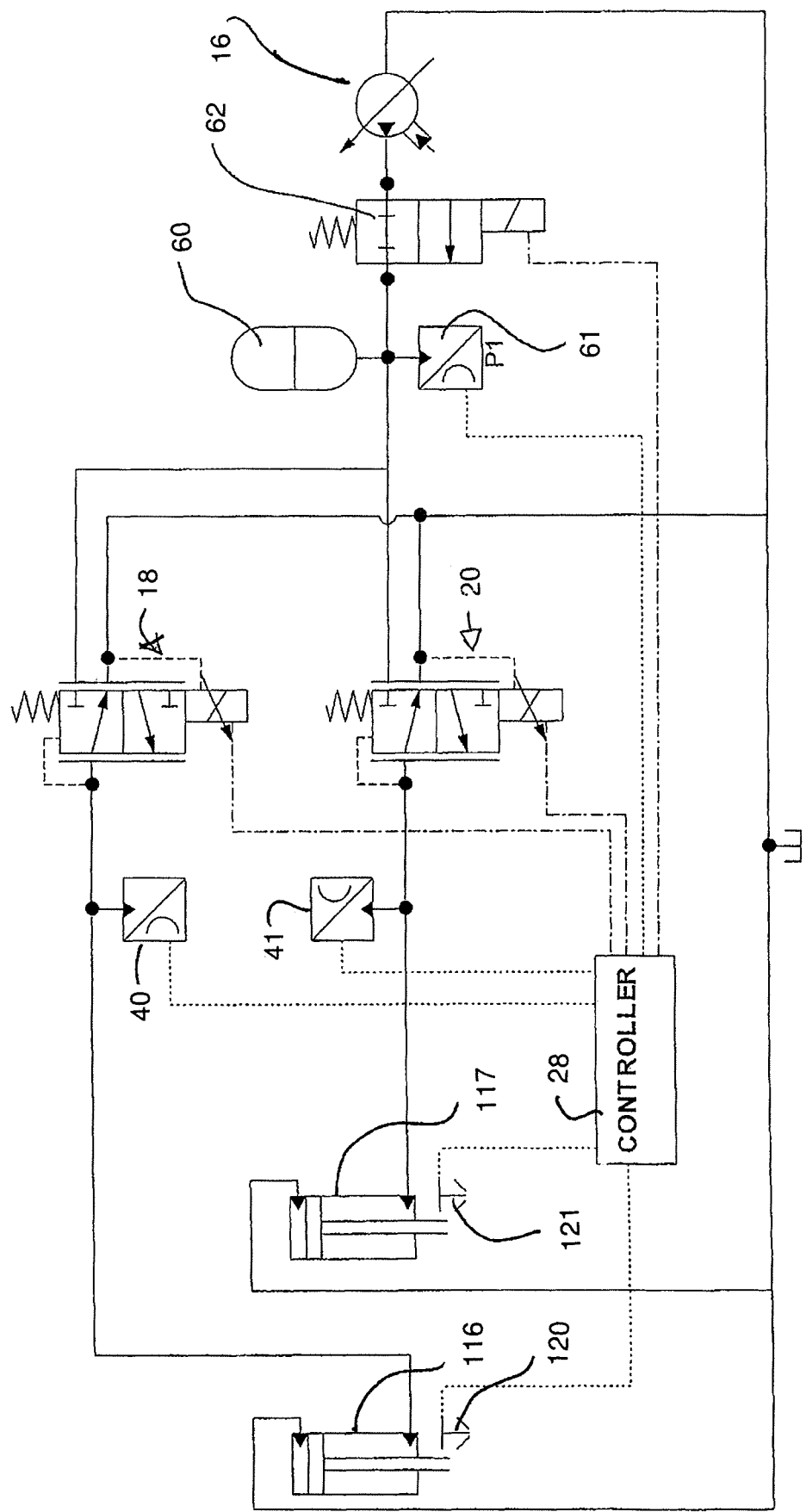
FIG. 3 is a schematic illustration of a second arrangement of the control system according to the present invention for use in the header of FIG. 1 which includes an accumulator as a part of the fluid source to ensure sufficient and immediate fluid flow to satisfy the PPRR valves.

In FIG. 3 is shown an arrangement in which there is provided on additional accumulator 60 which has a pressure sensor 61 and a supply valve 62. This accumulator can be used to provide or to ensure sufficient fluid flow to the inlet of the valves 18 and 20 to meet the requirements for rapid flow of fluid into the cylinders if required. In this way, if the pressure source 16 which comprises a pump has insufficient flow rate at startup, the flow can be provided by the accumulator.

Figure 4:
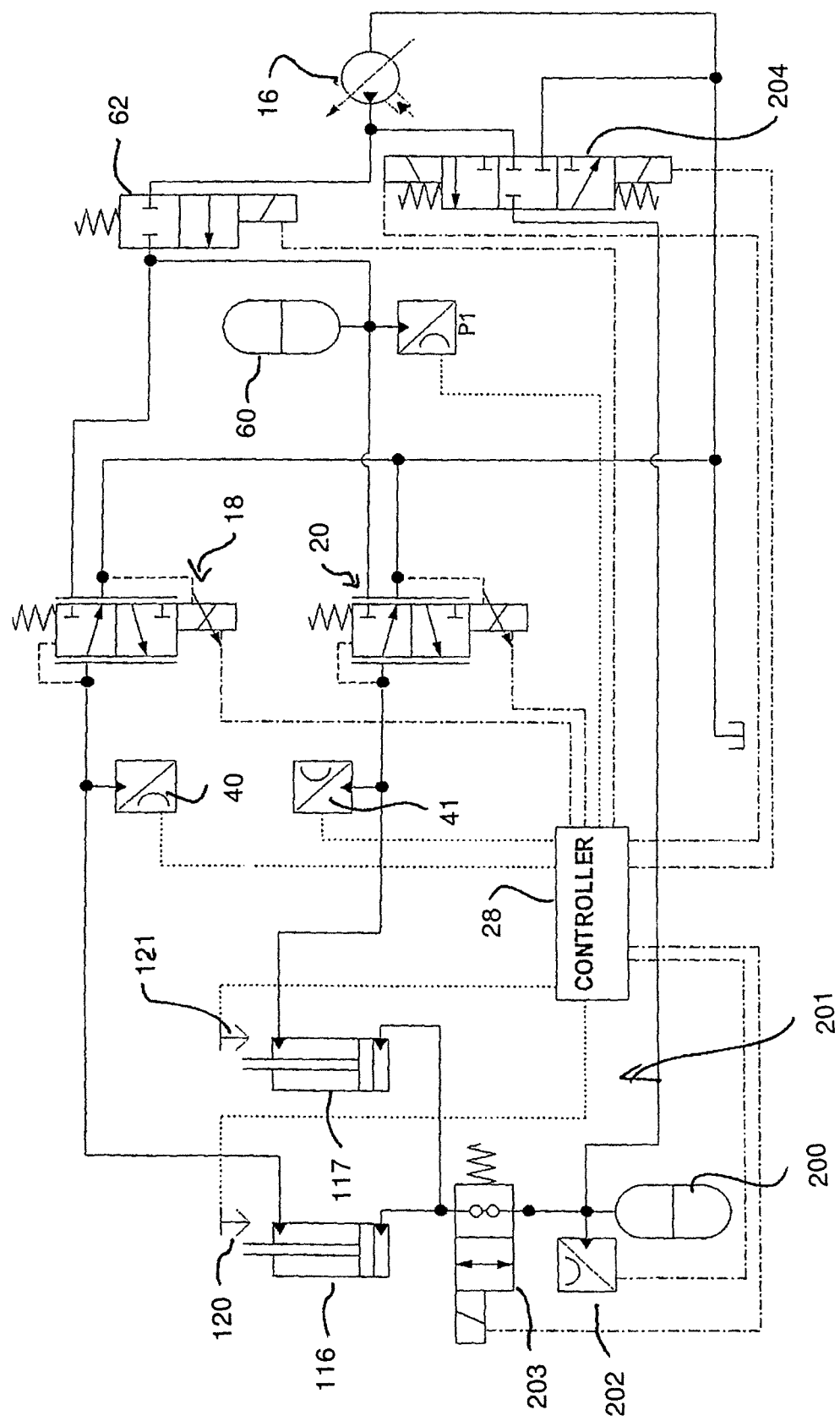
FIG. 4 is a schematic illustration of a third arrangement of the control system according to the present invention for use in the header of FIG. 1 arranged to capture energy of header floating.
Figure 5:
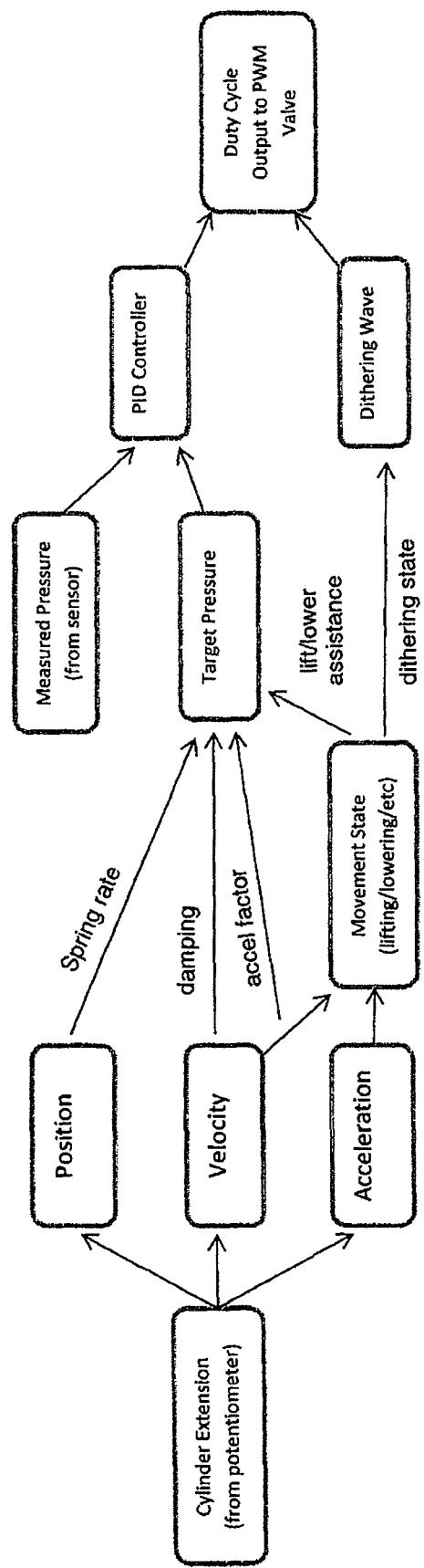
FIG. 5 is a flowchart showing the operation of the system.

In FIG. 4 is shown on optional hydraulic schematic to capture energy of header floating can also be used.

Figure 2:
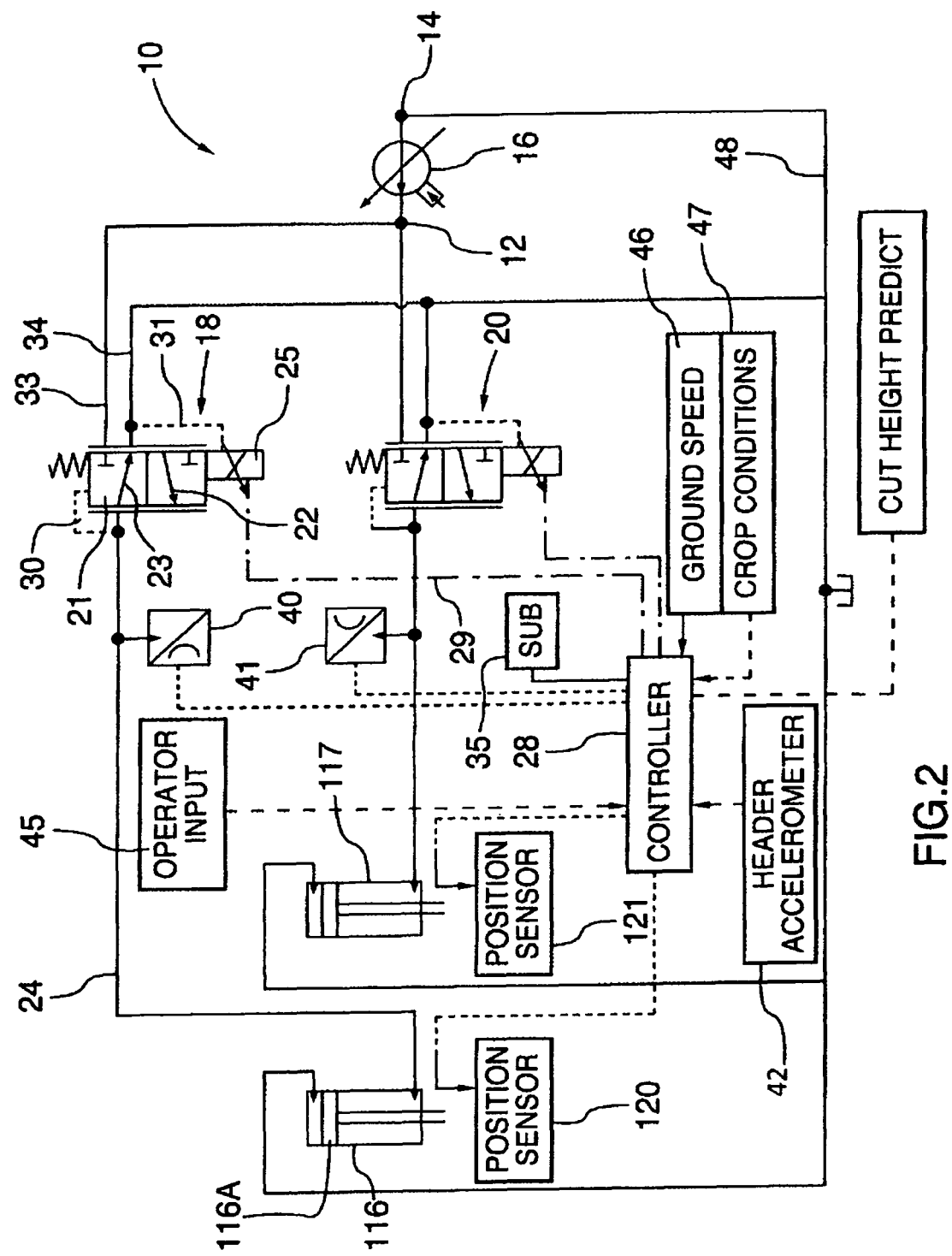
FIG. 2 is a schematic illustration of a simple arrangement of the control system according to the present invention for use in the header of FIG. 1.

In this version of the invention, the cylinders 116 and 117 are inverted relative to that shown in FIGS. 2 and 3. Also the pressure supplied to the cylinders from the valves 18 and 20 is opposed by pressure from a supply 201 including an accumulator 200 at a constant pressure so that a first or main lift force is generated by a difference in pressure from the valves 18 and 20 relative to that of the supply 201. In other words, the first or main lifting action is provided by the pressure from the source 201 and this is opposed by a supplementary force generated by the pressure supplied by the valves 18 and 20 to decrease the lifting force to a value determined by the valves 18, 20 under control of the control system 28. In order therefore to increase the lifting force, the pressure in the cylinders supplied by the valves 18, 20 is reduced, and vice versa.

That is there is an additional accumulator 200 that supplies the first or main float force or float energy to the float cylinders that is above what is normally required to float the header. The PPRR valves 18, 20 are controlled to add the supplementary force or down force to the cylinders 116, 117 to make the header float down to the ground. The control system for the PPRR valves is similar to the arrangement described above but with this system, the flow and/or pressure required to adjust the float are lower.

Also with this system, the system is capturing the energy from the header floating down, into the accumulator 200 using an intervening shut-off valve 203 which acts as a lock out valve used when the floating action is to be deactivated. A pressure sensor 202 and control valve 204 are used in conjunction with the controller 28 to control the pressure in this accumulator system.

In most cases each cylinder 116, 117 in this arrangement will have separate accumulator 200 independent of the accumulator of the other cylinder. As movement of the piston in the cylinder 116, 117 changes the volume of the chamber below the piston which is the lift pressure side of the piston, fluid must flow between the bottom/lift side chamber and the respective accumulator 200 which will change the pressure in the chamber as the accumulator is of finite volume. This change in pressure thus will change the lift pressure and hence require a change in the down force pressure from the upper chamber and the valve 18, 20 to maintain a required total lift force. This can be compensated by using the signal from the sensor to calculate the change in pressure that occurs or more preferably the pressure at each of the two accumulators 200 is detected by the pressure sensor 202 and communicated to the control 28. This allows the calculation of the required pressure at the top or down pressure chamber to take into account the required change to create a new set point for the pressure and also the required change to take into account the change in lift pressure in the bottom chamber.

As set forth above, this is maintained at a constant value, which can be set at different values depending on various operating parameters, and the variations in the lifting force are applied by the valves 18, 20 on the upper side of the piston to apply a variation in the pressure opposing the constant upward force on the lower side of the piston.

Thus the float cylinders can be used in either orientation, and are shown inverted in this embodiment. It can be appreciated that the float cylinders could be used in a pull configuration rather than a push configuration as well. In all FIGS. 2, 3 and 4, the header weight is in the downward direction. That is the variations in the pressure supplied by the valves can be used in a number of different orientations to change the lift force generated by the cylinders.

The sensors to collect information about the dynamic state of the implement can include a linear potentiometer which measures the extension of the hydraulic cylinder and a pressure transducer providing feedback of the supplied pressure. In other interpretations, the force transmitted to the implement through the hydraulic cylinder could be monitored with a force transducer or the height of the implement from the ground could be measured either directly or indirectly.

In addition, instead of calculating velocity and acceleration from the position sensor, movement sensors and accelerometers can be used to provide direct signals proportional to these values.

The arrangement could be used to achieve a comprehensively adjustable spring rate for the dynamics of the flotation system of the implement The arrangement could be used to achieve comprehensively adjustable damping for the dynamics of the flotation system of the implement The arrangement could be used to achieve comprehensively adjustable flotation system dynamics based on operating state of the implement including but not limited to implement height, ground speed and changes in terrain (incline angle, etc)

The arrangement could allow for the operator to select from pre-set flotation system dynamics which can be tailored to different field conditions and implements.

While existing float systems can achieve acceptable ground forces when the header is stationary, because the applied force is generally independent of the header's state of motion, the header will still dynamically respond based on its mass, not the set point of the float system. For example, the float system could be set such that the ground force is 500 lbs, however, in order for the header to accelerate upwards or downwards, an additional input of force is required. Based on Newton's second law (F=ma), this additional force will generate an acceleration in the header which is inversely proportional to the header's mass. Therefore, while the header may be statically light (i.e., light when it is stationary), in order for it to actually move up and down to follow the ground, its dynamics will still be governed by its mass and higher ground forces will be required to actually lift the header. An implication of this arrangement is that the lower the static ground force is set, the slower the header is able to fall. This is because the maximum input force into the float system to make the header fall is equal to the floated weight of the header. Therefore, the smaller the floated weight of the header, the smaller the resulting acceleration. The existence of friction within the system will also factor into how light the float system is able to be. Friction creates an asymmetry between the required ground force when lifting and lowering the header. This leads to higher ground force when lifting and slower movement when lowering. This also creates a limit to how light the static ground force can be set as the floated weight must be larger than the friction in the system in order for the header to actually be able to fall after being lifted.

The float system of the present invention allows these limitations to be reduced because the force applied by the float system can be controlled based on the header's state of motion. Based on the sensor feedback collected, the controller can actually add more force to the system when the header is being lifted in order to help it lift more quickly with less ground force. Additionally, when the header starts to fall, the controller can decrease the applied force so that it falls more quickly. By being able to adjust the force provided by the float system based on the header's state of motion, the dynamics of the header can be altered so that it is no longer governed solely by the mass of the header. This can allow a heavy header to not only have acceptable ground force when stationary, but also lift and lower as though it actually has less mass. This also circumvents the limitation that the minimum downwards acceleration is tied to the floated weight of the header, allowing the float system's stationary ground force to also be lower than could be achieved with a conventional float system.

It is desirable to provide mechanical improvements such as reduced system friction, a smaller dead band in the hydraulic valve and reducing hydraulic restriction for flow traveling into and out of the cylinder since these will reduce the amount of intervention required by the controller to produce favourable dynamics. Improving the quality of the feedback signals to reduce the effects of noise (both mechanical and electrical) provides the controller with more reliable data from which to make control decisions.

The intention of a float system is to reduce the ground force of a header in order to reduce wear and improve ground following capabilities. To date, all float systems are based on a static balance of the implement. In other words, a force is applied such that it lifts a portion of the header's weight so that the ground force is lower. Provided the header is not moving up or down throughout its float range, this system is effective at reducing ground force. For example, if a header weighs 7000 lbs and the float system is set to carry 6800 lbs, then only 200 lbs needs to be reacted by the ground. However, considering only the static state of the system neglects two important factors; friction and inertia.

In a friction-less system, the ground force is the same whether the header is being lifted or lowered (assuming this is done very slowly). However, when friction is introduced in the system, the ground force is no longer the same when lifting and lowering. In fact, the difference between the ground force when lifting and lowering is equal to twice the friction in the system. As a result of friction, there is a minimum ground force which can be achieved. If this minimum threshold is exceeded, the header will no longer fall under its own influence after it is lifted as the floated weight of the header is not sufficient to overcome friction. While minimizing the friction in the system can help to reduce this effect, it will still represent a limitation of the system.

Another important short-coming of basing a float system on the static balance of the header is that the dynamics of the header will still be governed by the header's weight when it is in motion. Based on Newton's second law:

$$a_{header} = \frac{F_{float} + F_{ground}}{m_{header}} - g$$

Thus a 7000 lbs header (with no friction), set to 200 lbs static ground force can only achieve a maximum downwards acceleration of 0.03 g. It also requires 900 lbs of ground force to accelerate the header upwards at 0.1 g. While the static ground force can be set reasonably light, the lighter this becomes, the slower the header is capable of falling after being lifted. Also, the slope of the line (and consequently the ground force required to produce a given acceleration) remains tied to the mass of the header, not to the set point of the float system. As a result of this limitation, the header will still respond dynamically like it is 7000 lbs; all the float system is able to change is the static ground force of the system. When the effect of friction is combined with this limitation, it is unsurprising that there are limitations to how light an existing float system can get before its ground following capabilities are compromised.

In order to try and improve the dynamic response of the float system, the float system needs to not only change the static ground force, but also how much ground force is required to lift and lower the header. The hydraulic float system described herein achieves this is by introducing feedback regarding the dynamic state of the system into the float control system. While a wide number of different measurements can be used to infer information regarding the dynamic state of the system (such as force, hydraulic pressure or other kinetic measurements), as described herein, the extension of the float cylinder is measured with a potentiometer and this signal can be differentiated numerically to determine the full kinematic state of the system.

In order to alter the dynamics of the header using the float system, the input force from the float system cannot remain constant, but instead must vary with respect to the dynamic state (velocity and acceleration) of the header. The goal of the control algorithm is to not only reduce the static ground force when the header is stationary, but also to reduce the amount of force required to lift the header and to allow the header to fall more quickly (as though it were a lighter header). Such a system allows for lower ground force as well as better ground following capabilities. A dynamically changing force applied by the float system can reduce the impact of friction within the system.

The target pressure calculated by the position, velocity and acceleration state of the cylinder is generated by using a simple PID controller. This PID intermittently looks at the difference between the target pressure and the measured pressure and then adjusts the output to try and minimize the error. The PID controller can be supplemented with an open-loop lookup table. The ability to robustly and reliably maintain the cylinder pressure at the target pressure facilitates the development of a responsive and stable cylinder response.

Dithering is superimposed on the output to the PWM valve in attempt to reduce the amount of hysteresis in the system. Dithering is the intentional addition of "noise" into the signal. In this setup, sinusoidal dithering waves were used. It should be noted that while the output of the controller can be sinusoidal, the achieved pressure fluctuation is not necessarily perfectly sinusoidal due to the ability of the hydraulics to replicate the input signal. This dithering signal was calculated and simply added to the output of the PID controller to obtain the total output to the valve.

There are three parameters which can be controlled to change the nature of the dithering; the wave's amplitude, period and shape (sinusoidal, square, triangular, etc.). A variety of different parameters can be used to try and reduce hysteresis and improve the response of the system.

Relatively effective dithering can be achieved with a dithering wave period of only 80-100 msec and an amplitude of only 2% of the overall operable PWM duty cycle range although both a longer period and higher amplitude dithering wave can be necessary to achieve a similar result.

The period of the dithering wave appears to be bounded on the low end by the responsiveness of the PRR valve as well as the ability to deliver the flow required to move the cylinder. Above this lower limit, the effect of the dithering wave is more directly related to the power input of each half waveform. Consequently, a higher amplitude waveform is necessary at shorter dithering periods, while a lower amplitude waveform can be used with a longer dithering wave period. By maintaining a dithering magnitude of 7% and varying the dithering period at short dithering periods of <150 msec were not particularly effective. Dithering periods of 200-250 msec are effective, whereas if the dithering period is increased further, the header can noticeably shake. This shaking could be reduced by lowering the amplitude of the waveform so that the power of each half waveform is lower. However, it is best to keep the dithering period as low as possible in order to help improve the reaction time of the system, so the shortest dithering period which is effective should be selected.

Any required motion will only be aided by half of the dithering waveform and hindered by the other half of it. It is helpful to interpret the dithering wave as the controller consecutively checking to see if the header wants to lift, and then checking if it wants to lower. The amount of power in the dithering half-wave required to perform these checks will relate to both the friction in the system as well as the responsiveness of the hydraulics. It is helpful to disable dithering when in a lifting or lowering state as half of the dithering wave will be acting against the intended motion.

Pressure, position, velocity and acceleration inputs into the control structure are calculated as follows. As discussed previously, the cylinder is kept in constant motion by having the pressure in the cylinder always varying slightly by having a sinusoidal wave applied to the valve output (referred to as dithering). This can make it more difficult to determine the pressure and position of the cylinder as this adds a substantial amount of noise. As a result, filtering and averaging techniques are used to try and distinguish the bulk movement of the system while ignoring the motion caused by dithering. These techniques can retain more responsiveness by using the properties of the dithering wave instead of simply filtering more aggressively.

Since dithering creates variation in both the pressure in the cylinder as well as the position, both of these values are averaged over a single dithering wave period in order to try and reduce the influence that dithering has on their calculation, A shorter dithering period is therefore desirable to help improve responsiveness of this calculation.

Since the velocity and acceleration terms are based on a difference calculation, these are performed differently than the position and pressure terms; instead of looking at only a single dithering period, these calculations look at the last two dithering periods. The position (or velocity) is then compared at equivalent locations within the dithering wave. This allows for the calculation to be sensitive to changes in position which are lower in magnitude than those created by the dithering wave. Again, the calculation is averaged over a single dithering period. The velocity is calculated by looking at how much the position has changed between comparable locations in the dithering waveform. In order for a hydraulic float system to produce adequate ground following capabilities, it is desirable for it to mimic the response of a spring. In order to simulate a spring-like effect, the extension of the cylinder is used to vary the cylinder pressure. In this setup, a simple linear spring rate was added. The spring rate is introduced by creating a linear function which determines the target pressure based on the measured cylinder extension. This made the required input force get higher as the wing was lifted higher. The below equation shows the most recent spring rate used to alter the header's dynamics:

$$P_{target} = P[psi] - \left(0.26\left[\frac{psi}{mm}\right] * y[mm]\right)$$

Based on the current spring-based system, it is believed that having the header get heavier as it gets lifted is beneficial. This has the effect of biasing the header so that it naturally wants to fall. However, provided that the target pressure at a given height leads to a non-zero ground force, the header should always want to fall. If terrain leads to extended periods of time spent with the header either raised or lowered, these periods of time occur with ground force which is either lighter or heavier than the set point. Provided the spring rate is not set particularly aggressively, this is likely not an issue, however, there may be value to having a more even header response throughout its range of motion to avoid it either being too light and wanting to lift off when too heavy and inclined to push when too light.

In one arrangement, the header's set point pressure can follow around a moving average of the header's position. This is an effective way to implement a spring rate without sacrificing header pressure performance when spending extended periods of time away from its normal position. Such an arrangement makes the header initially want to return to its last position (by either getting heavier when lifted or lighter when lowered), but have it adapt to a change in position if it is maintained for a period of time.

In addition to having the dynamics of the header change with respect to the header's position through the use of a spring rate, the header's potentiometer signal is also used to change the target pressure with respect to velocity and acceleration. As described previously, both the velocity and acceleration terms were calculated in a way as to try and minimize the detection of movement caused by dithering so as to only focus on the header's bulk movement The velocity term relates to the damping of the system. However, since the header already had an over-damped response, this term is used to try and reduce the damping of the system by reinforcing the motion of the header. This term has some similarities to lift and lower assist pressures except instead of adding a constant pressure to the target, the effect varies with the magnitude of the header's velocity. It should be noted that this term would have the effect of tending to de-stabilize the header. It is helpful to create a nonlinear velocity-based function which restricts smaller velocities and reinforces larger velocities. It would also likely be beneficial to make this term saturate at a maximum value to ensure this effect does not reduce the require ground force to lift the header below zero (which would cause the header to continue to accelerate upwards until it reached full raise.

$$P_{target} = P[psi] - \left(6.0\left[\frac{psi}{mm/s}\right] * \dot{y}\left[\frac{mm}{s}\right]\right)$$

The acceleration term relates to the inertia of the system. By reinforcing accelerations, the controller is able to reduce the effective inertia of the header to help it to react to input forces as though it weighed less. However, in practice, taking a numerical second derivative of a sensor input is inherently noisy, so the ability to implement this is limited. That said, there is still value to incorporating a term which ties target pressure directly to the acceleration of the header to some extent. While initially a single constant is used, this term can be split into two parameters; one to control the impact of positive accelerations and one to control the impact of negative accelerations.

$$P_{target} = P[psi] - \left(0.4\left[\frac{psi}{mm/s^2}\right] * \ddot{y}\left[\frac{mm}{s^2}\right]\right) \text{ for } \ddot{y} \geq 0$$

$$P_{target} = P[psi] + \left(0.06\left[\frac{psi}{mm/s^2}\right] * \ddot{y}\left[\frac{mm}{s^2}\right]\right) \text{ for } \ddot{y} < 0$$

Positive accelerations relate to when ground force is increased and the header starts to lift, or when the header impacts the ground after falling. In order to help the header stick after it lands on the ground, positive accelerations were used to decrease the target pressure of the controller somewhat. This makes the header heavier momentarily when it contacts the ground to help stop it from bouncing up again. This does also have the effect of make the header somewhat heavier when you first try to lift it. However, since the acceleration of the header impacting the ground is notably larger than the acceleration input when lifting the header, the effect is more noticeable in the case of an impact.

Negative accelerations relate to when the header slows down while lifting and begins to fall. In order to help stop the header from hanging up, negative accelerations are also used to decrease the target pressure of the header, making it momentarily heavier and therefore less likely to hang up. If you begin to slow down the rate at which you lift the header, it starts to get heavier.

It is possible to develop nonlinear equations which use the position, velocity and acceleration states of motion (as well as other variables such as ground speed, cut height, etc.) to extensively customize the dynamic response of the system.

Translating the control structure's target pressure into the output float force of the system quickly and accurately is important for optimizing the system response. While the closed loop PID structure is quite effective at replicating the target pressure, more advanced control techniques can help to further improve this response. The inclusion of an open loop lookup table and downgrading the PID controller to a correction factor can be used. It is possible to reduce the impact of valve lag by providing momentary overshoots in the current output to the solenoid to help it change directions more quickly.

Reliably and robustly measuring the position, velocity and acceleration of the cylinder is required for responsively controlling the float dynamics without introducing instability. It is desirable that these calculations provide a clean signal with as little lag as possible. In the current configuration, all calculations are tied to the dithering period, regardless of whether dithering is actually active. It may be beneficial to move towards two distinct calculations; one when dithering is active and one when it is not. This may help to allow for higher responsiveness is situations where noise caused by dithering does not need to be accounted for.

The hydraulic float system described herein provides a float system which is more responsive, with improved ground following capabilities and a lower ground force. The system is based on using an electronic controller and feedback from sensors in order to decide what pressure should be supplied to the hydraulic float cylinder. This pressure is then supplied by using a proportional pressure reducing/relieving valve based on the output signal from the controller. The resultant system allows for a highly customizable hydraulic pressure (and consequently force) provided by the float system. This allows for the float system to adjust the force provided by the float system in order to reduce the effects of friction in the system as well as to fundamentally alter the dynamics of how the header moves.

Figure 6:
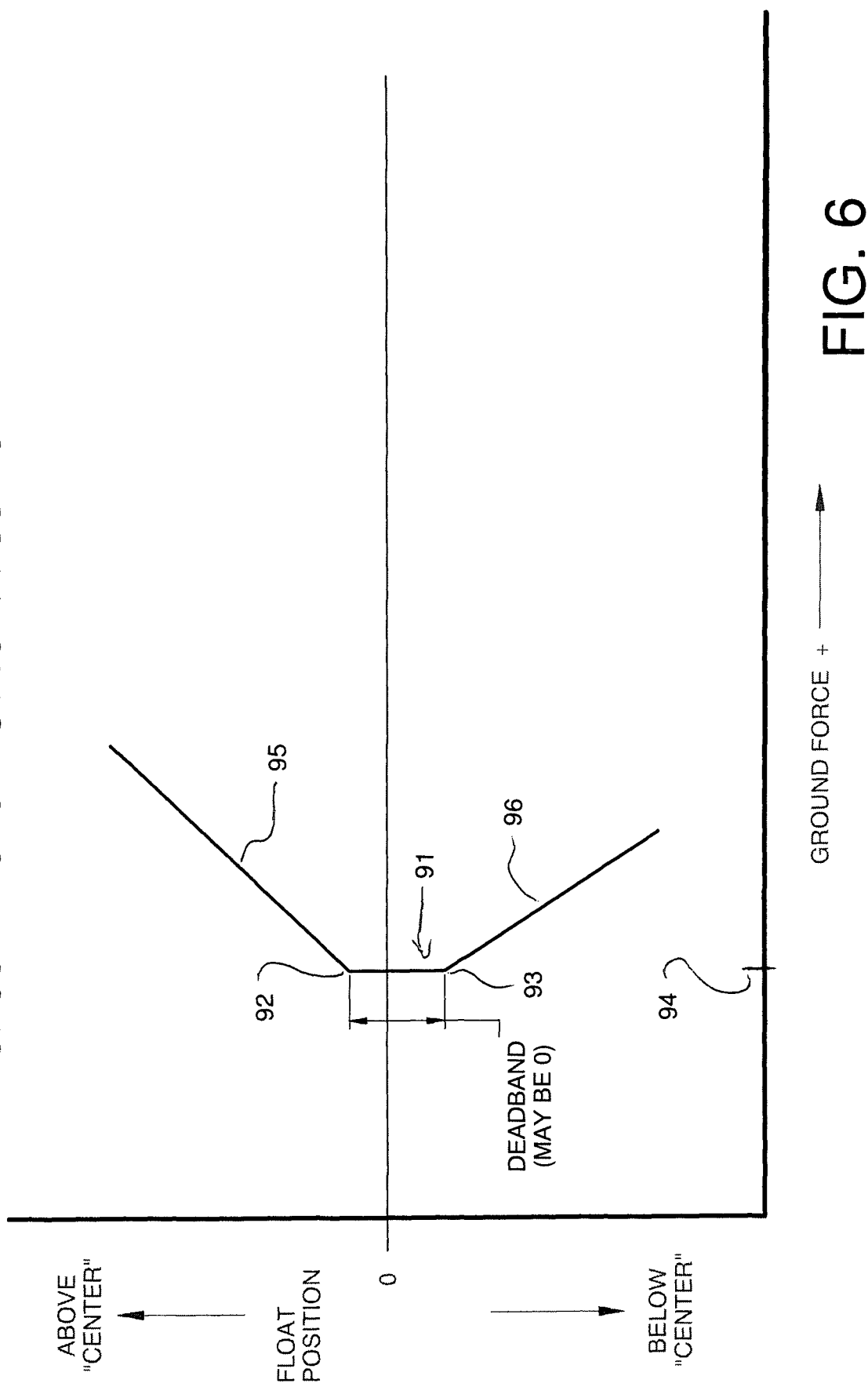
FIG. 6 is a graph showing the operation of the system to change the ground force in response to movement of the header.

Turning now to FIG. 6, there is shown a graph of the operation of the system to change the ground force in response to movement of the header.

As shown, there is provided an intermediate area or center zone which acts as a dead band where no change in ground force is applied as indicated at 91 in response to changes in header height as detected by the sensors 120, 121 previously described which detect the positions of the cylinders. At each end 92, 93 of the center zone the ground force is increased from a set value 95 as indicated at 95, 96 on a linear scale directly proportional to the ground height. It will be noted that ground force is increased both as the height increases or raises from the nominal base height indicated at 0 and as the height decreases or falls. The rate of increase in ground force is greater as shown at 96 as the header rises than as shown at 95 where the header falls. These rates of increase can be tailored to provide a response of the header to movement which best keeps the header in contact with the ground. The rates can be linear as shown. The rates can be more complex including portions determined by velocity and/or acceleration of the header in its upward or downward movement. It is preferred that the rate of increase in down force is greater on the lift side of the center zone than on the lower side because the lifting action is often caused by impact with an obstacle so that it is more aggressive or vigorous in the movement requiring a greater response by the float system by an reduction in the lift force.

The center zone or dead band 91 can be zero or a point on the center line 0, or it can have a finite extent so as to allow small changes in height to occur before the change in float is introduced so as to reduce the lift force causing an increase in ground force. This length of the center zone 91 and also the rate of proportionality 95, 96 may be adjustable by programming.

It will be understood that the conventional feeder house of the conventional combine harvester of the header system herein typically includes a centering system in which the feeder house is raised and lowered continually in a hunting action trying to maintain the height of the header support on the feeder house at a mid-height of the floating action. That is the center point is continually changing as the feeder house looks to maintain the header float height in the middle of the float range. However the intermediate area of center zone is generally at the middle between the upper and lower limits of floating movement. In a typical system, the floating action may be of the order of 6 inches in either direction from the center point. A suitable dead band might be 1 to 2 inches to allow the cutter bar to float upwardly and downwardly over that distance without changing the lift force.

The increase in ground force is obtained in the arrangement of FIG. 3 by decreasing the pressure in the cylinders acting to lift the header so as to reduce the lift force. In the arrangement of FIG. 4, the increase in ground force is obtained by increasing the back pressure in the back side of the cylinder against the constant lifting force provided on the lift side of the cylinder.

Figure 7:
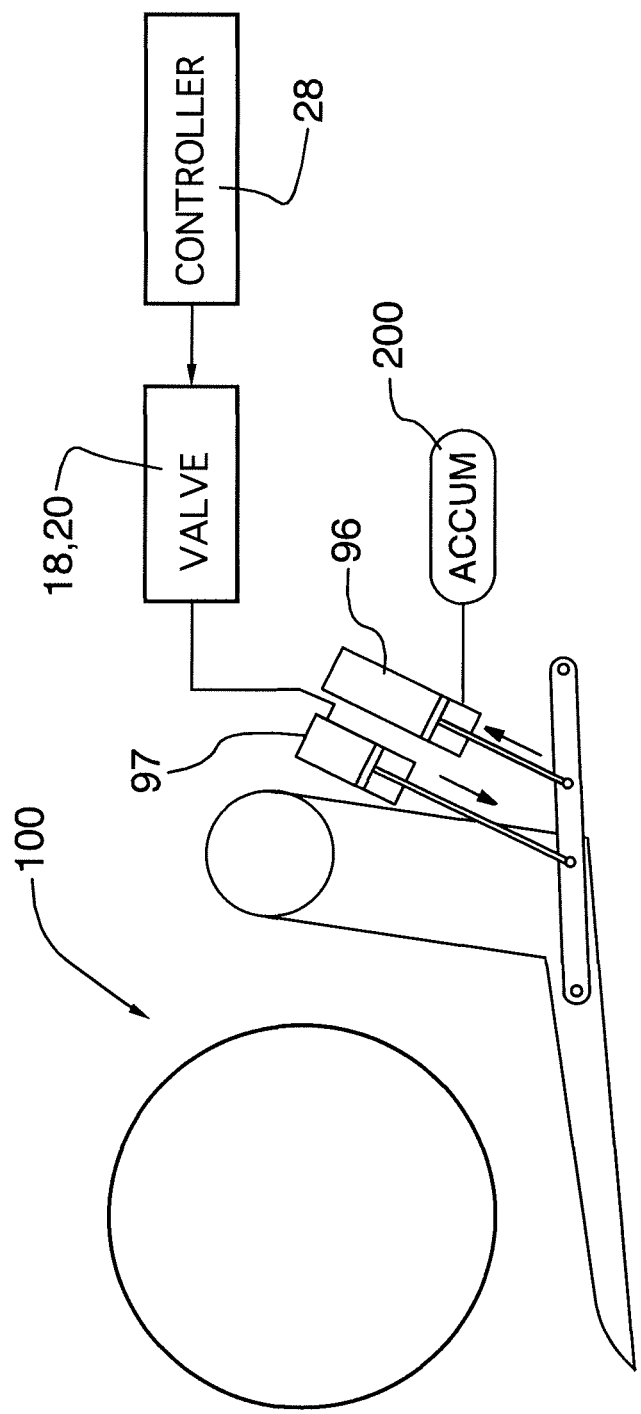
FIG. 7 is a schematic illustration of a system similar to that of FIG. 4 where the lifting force greater than that required to lift the header is provided by a hydraulic cylinder and is opposed by a second cylinder or other pressurized device such as a gas bag where the pressure of the second cylinder is controlled by the valves.

As shown in FIG. 7 there is provided a system similar to that of FIG. 4 where the lifting force greater than that required to lift the header is provided by a hydraulic cylinder 96 and is opposed by a second cylinder 97 where the pressure of the second cylinder 97 is applied in the downward direction opposing the lift force from the cylinder 96 and is controlled by the valves 18, 20 as described above under the control of controller 28.

Figure 8:
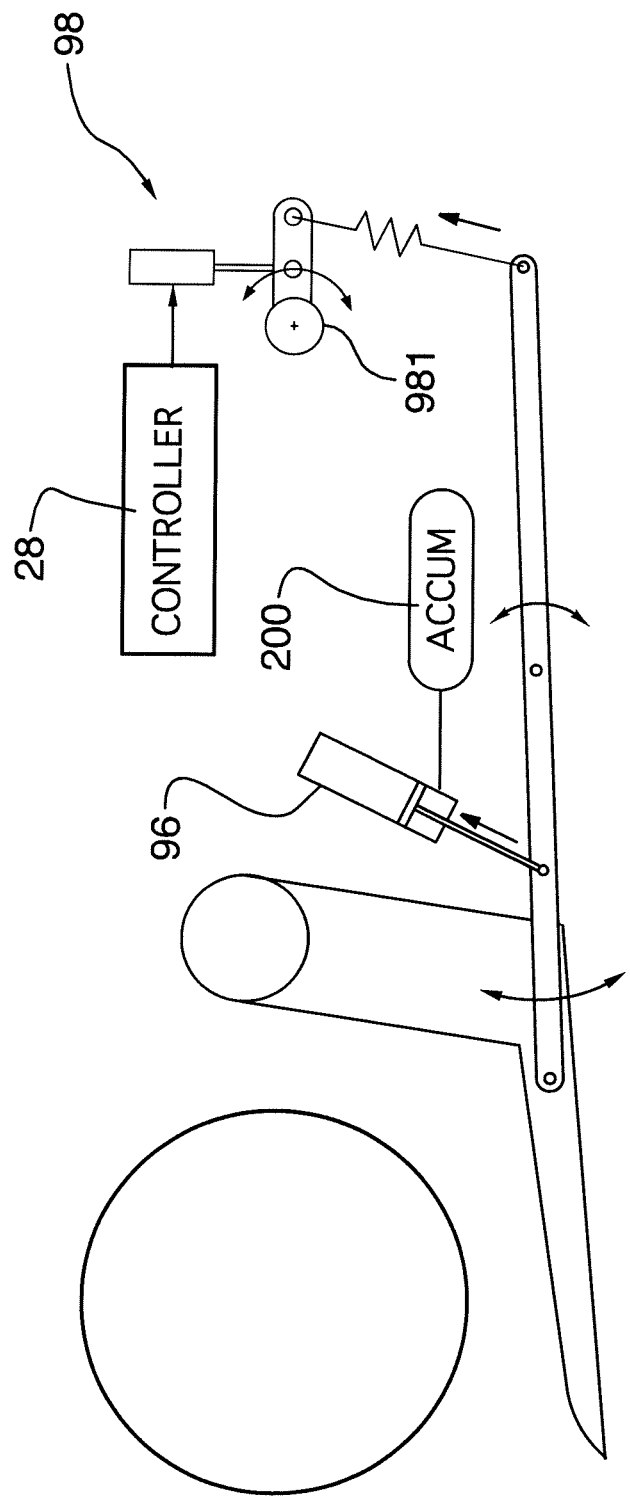
FIG. 8 is a schematic illustration of a system similar to that of FIGS. 4 and 7 where the lifting force greater than that required to lift the header is provided by a hydraulic cylinder and is opposed by a mechanical spring arrangement where the spring force applied by the spring is adjusted by a mechanical system operated by the controller.

As shown in FIG. 8 there is provided a system similar to that of FIG. 4 where the lifting force greater than that required to lift the header is provided by the hydraulic cylinder 96 and is opposed by a mechanical spring arrangement 98 where the spring force applied by the spring 98 is adjusted by a mechanical system 981 operated by the controller 28.

The system can thus go through the following steps:

Step 1—Both accumulators 200 and 60 are empty of oil.

Step 2—Charge the bottom accumulator to lift the header off the ground by adding oil from a charging circuit. The bottom accumulator set point pressure is typically between 1500-2400 PSI depending on header weight. Once this is done pressure in the bottom accumulator is locked in fixed pressure.

Step 3—Charge top accumulator 60 with oil. Add oil from external charging circuit. The pressure is maintained between 1100 and 2400 PSI using draper drive circuit and/or charge valves.

Step 4—Determine Float Set-point. Command PPR valve to increase pressure until header is back down to the down-stop. Pressure in the bottom accumulator has increased due to oil being forced into bottom accumulator 200. When header is on down-stop, remember this pressure as the set-point for float Step 5—Float active. Adjust pressure here using PPR valve 18, 20 to balance header weight and maintain desired ground force. The amount of pressure required depends on position in float range. Add oil intermittently as required from a pressure source such as the draper drive circuit. Typically varies between 1000 and 3000 PSI. The bottom system remains closed. Oil flows in and out of accumulator 200 as header floats down and up. The pressure varies depending on float position. Gas pressure in accumulator relationship (ignoring temperature changes). We can calculate what the pressure should be in the bottom accumulator based on the position sensor based on volume of oil in the accumulator. Therefore we can monitor the pressure and keep it within a tolerance range to compensate for leakage, temperature changes etc. This is done only intermittently and is only to compensate for the leakage temp changes etc.

The pressure reducing relieving valve (PRR) controls pressure between 0-820 PSI based on system requirements. The top accumulator 60 is a storage reservoir for immediate reaction time. This feeds pressure to both LH and RH systems. The position sensor senses cylinder extension with one on each side. The bottom accumulator is set to fixed pressure and maintained relative to float position. Each side has its own accumulator This arrangement allows the system to apply a 'spring rate' to the system that can add pressure to the top side of the cylinder to artificially make the header heavier as it floats up.

The system acts to sense the position of the cylinder and from that derives the velocity and the acceleration of the header. From this the system determines if the header is being forced up by the ground or if that force has disappeared. If the header is not accelerating up anymore (that is it has lost contact with the ground), the system acts to add pressure to the top of the cylinder and force it back down to the ground.

The system can add 'dither' to the top of the cylinder to keep the piston/rod seals in constant motion to reduce the effect of hysteresis.

Figure 9:
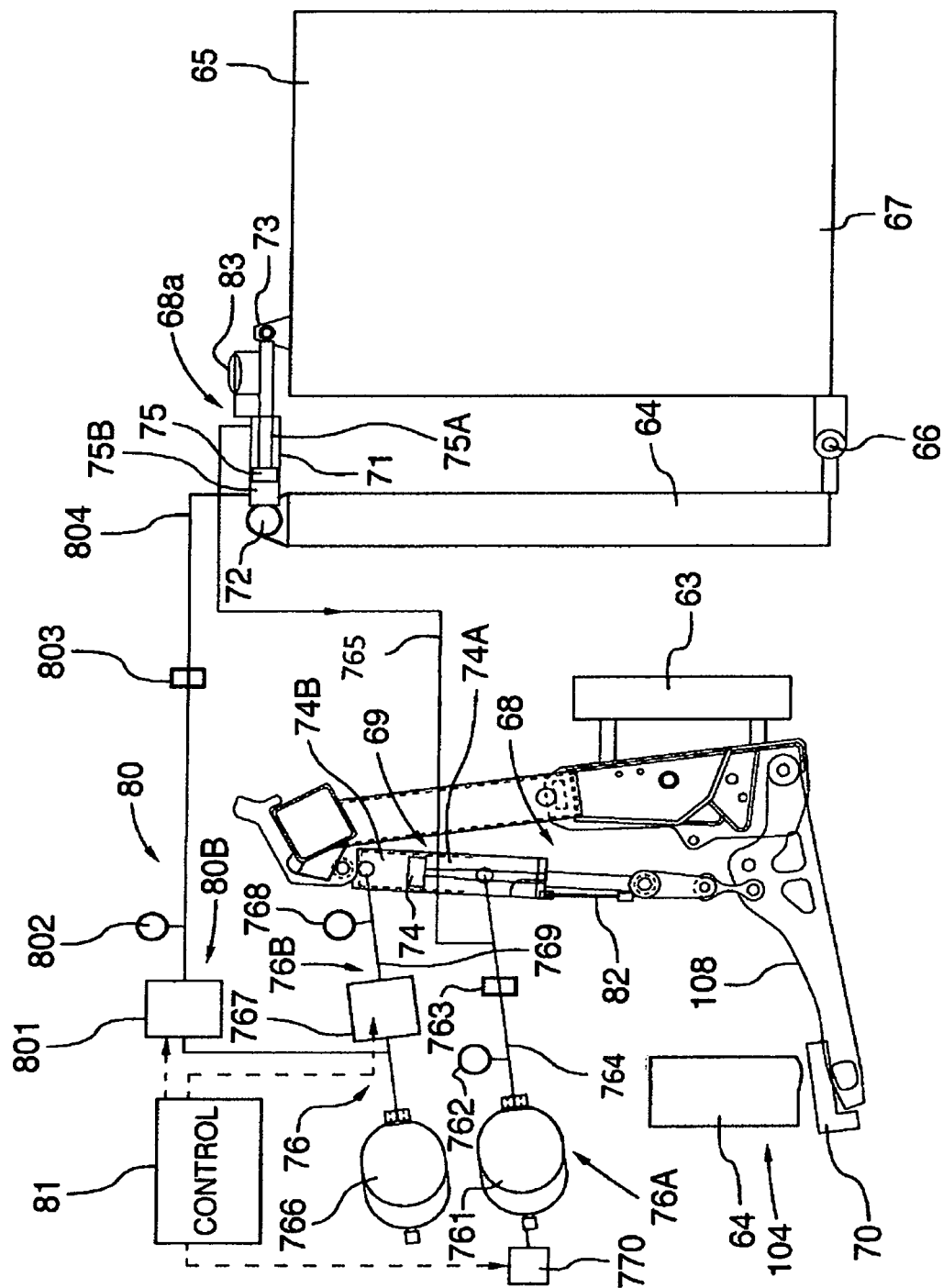
FIG. 9 is a schematic illustration of a first embodiment of suspension system according to the invention for a machine which includes a center or first section and a wing or second section which is pivotal relative to the center section and the system includes a first cylinder for providing a float of the first section relative to the support vehicle and a float of the second section relative to the first.

Turning now to the construction shown in FIG. 9, this includes all of the components described in detail above for controlling the lift forces to the structure. The crop machine, in this case a header 104 used on a combine harvester 63 shown only schematically.

The frame in this embodiment has a first or center frame section 64 and a second or wing frame section 65 coupled to the center section by a pivot 66 so that the wing frame can pivot upwardly and downward in response to ground contour changes with an outer end 67 of the wing frame moving upwardly and downwardly. That is the center frame section is pivotally connected at hinge 66 to the wing frame section about an axis generally parallel to the forward direction of travel of the vehicle for upward and downward pivotal movement.

Each of the center and wing frame sections has a crop component 114 including a crop engaging system comprising the cutter bar and at least one ground engaging component 128 for providing a supporting force from the ground as described above. These components are not shown in the schematic illustration of FIG. 9. It will be appreciated that typically there is provided also a second wing frame section symmetrical to the first and mounted in the symmetrical manner to that described herein.

A first support 68 is provided for supporting center frame section 64 from the vehicle 63. This support includes a cylinder 69 coupled at the top to a frame member of the combine provided at the front of the feeder house (not shown) and at the bottom to the link 108 which extends forwardly to the lift coupling 70 underneath the center section of the header. The wing section 65 is supported against downward pivotal movement to the ground by a support apparatus 68A including a further cylinder 71 connected between a coupling 72 at the center section and a coupling 73 on the wing section at the inner end of the wing section to hold the wing section at a required angle relative to the pivot 66.

The cylinders 69 and 71 are of the construction and operation as shown and described in relation to FIG. 4.

That is the center section 64 is carried on two cylinders 69 having the construction and operation of cylinders 116 and 117 one of which is shown at 69 in FIG. 9. The cylinder 71 of the wing section has the same construction and operation as one of the cylinders 116, 117. As shown in FIG. 9, the cylinder 69 of the center section works in cooperation with the cylinder 71 of the wing section.

Symmetrically another support cylinder for the center section works in cooperation with a cylinder of the second wing section but these are not shown and described as they are symmetrical to the components 69 and 71.

The support cylinders 69 and 71 act so that a proportion of a supporting force to counterbalance the weight of the crop component is supplied by a lifting force from the support apparatus and a remaining portion is supplied by the ground engaging component caused by ground pressure on the ground. This is clearly described above that the cylinders 69 and 71 operate in this manner in respect of the sections 64 and 65.

The cylinder 69 includes a piston 74 dividing the cylinder into lower and upper chambers 74A, 74B. The cylinder 71 includes a piston 75 dividing the cylinder into separate chambers 75A, 75B.

The first support apparatus 68 thus includes the first hydraulic float cylinder 69 and a first hydraulic system generally indicated at 76. The system 76 includes a first section 76A providing hydraulic fluid under pressure to the chamber 74A and a second section 76B providing hydraulic fluid under pressure to the chamber 74B.

The second support apparatus 68A thus includes the second hydraulic float cylinder 71 and a second hydraulic system generally indicated at 80. The system 80 includes the first section 76A, which is common to both cylinder 69 and 71, providing hydraulic fluid under pressure to the chamber 75A and a second section 80B providing hydraulic fluid under pressure to the chamber 75B.

The section 76A which is common to the chambers 74A and 75A includes an accumulator 761 charged to a required pressure by a charging system 770, a pressure sensor 762, a lock valve 763, a path 764 to the chamber 74A and a path 765 to the chamber 75A.

The section 76B to the chamber 74B includes an accumulator 766, a PPRR valve 767, a pressure sensor 768 and a path 769 to the chamber 74B.

The section 80B to the chamber 75B includes the accumulator 766, a PPRR valve 801, a pressure sensor 802, a lock valve 803 and a path 804 to the chamber 75B.

The common accumulator 761 to the chambers 74A and 75A acts to charge these chambers to a lift pressure greater than the required lift pressure. The accumulator charged to a set pressure as described above.

The PPRR valves 767 and 801 operate in the manner described above in relation to the chambers 74B and 75B.

An electronic control system 81 receives inputs from position sensors 82 and 83 detecting positions of movement of the cylinders 69 and 71. The control 81 provides outputs to control the PPR valves 767 and 801 and the charging system 770.

As previously described, the cylinders 69 and 71 thus provide a lift force on the side of the pistons 74 and 75 defined by the chambers 74A and 75A which is set to a required value by the charging system 761 and maintained at the set value and only controlled against drift. A back pressure is applied by the PPRR valves 767 and 801 to the chambers 74B and 75B under control by the control 81 using the operations and algorithms described above.

The control 81 thus acts for supplying a control signal for varying the pressure of a least the first hydraulic system 76 by controlling the valve 767 to change the back pressure in the chamber 74A. in order to do this the control 81 receives communication from the position sensor 83 at the second support apparatus 68A such that the pivotal movement of the wing frame section relative to the center frame section changes the pressure in the first hydraulic system of the center section.

Also as shown, the control 81 receives communication from both the first support apparatus at the position sensor 82 and the second support apparatus at sensor 83 for varying the pressure of both the first and second hydraulic systems at the valves 767 and 801.

As described previously, the valve 767 has the characteristic that the valve arrangement acts to maintain the pressure of the hydraulic fluid in the chamber 74B at a constant value dependent on the control signal from the control 81. Symmetrically and at a different pressure as required, the valve 801 has the characteristic that the valve arrangement acts to maintain the pressure of the hydraulic fluid in the chamber 75B at a constant value dependent on the control signal from the control 81 during changes in volume of the chamber caused by movement of the piston.

The first hydraulic system comprises a first lift pressure system 76A arranged to apply a pressure to a side of the piston 74 in the cylinder 69 in a direction to lift the crop component where the pressure defines a lifting force greater than a required lifting force and the down pressure system 76B for applying a down pressure in a direction to lower the crop component and to apply the ground pressure on the ground. The second hydraulic system 80 comprises a second lift pressure system defined by the common system 76A arranged to apply a pressure to a side of the piston 75 in the second cylinder 71 in a direction to lift the crop component and the second down pressure system 80 for applying a down pressure in a direction to lower the crop component and to apply the ground pressure on the ground.

The electronic control system operates to vary the first and second down pressure systems and not on the first and second lift pressure systems which remain constant when set by the charging system 770.

The first and second lift pressure systems defined by the common system 76A include the common accumulator 761 so that downward flexing of the wing frame section forces additional fluid from the chamber 75A into the chamber 74A of the cylinder 69 to apply additional lift pressure to the center frame section. and such that upward flexing of the second frame section removes fluid from the cylinder of the first hydraulic system to apply reduced lift pressure to the first frame section.

As previously described and shown in FIG. 6, the control 81 is arranged to vary the pressure in the chamber 74A of the cylinder 69 so that the lifting force is reduced both when the crop component floats upwardly from an intermediate float position and when the crop component floats downwardly from the intermediate float position.

As described above the control 81 is operated to generate a value indicative of acceleration and/or velocity of the crop component in said upward and downward floating movement of the crop component and to vary the control signal in response to said value of acceleration and/or velocity.

FIG. 9 shows one side of the entire system, where the illustrated components are duplicated for the other side of the header, except for the top accumulator 766, there only one is required for the entire machine and this accumulator has sufficient pressure and flow rate to feed all four PPRR valve arrangements.

In this embodiment, we have one accumulator 761 that is used to provide the pressure to float the entire one side of the header and float the wing. The cylinders can be sized so that the pressure required for each of these functions (float and flex) may be substantially equal so that the control pressures from the two PPRR valves 767 and 801 can be similar.

With this embodiment, when the wing floats up, the pressure in the bottom accumulator 761 will naturally decrease because oil will leave the accumulator to lift the wing which will cause the lift force of the float cylinder 69 to naturally decrease even before a change is to the top side 75B of the cylinder pressure with the PPRR valve. This is a desirable effect although not essential required since the system can obtain this control wholly by the PPRR valve. That is, in an alternative arrangement (not shown) the accumulator 761 is separate into two individual accumulators at their own set pressure with each charging the chambers 74A and 75A respectively whereupon the effect by which the chambers 74A and 75A communicate to automatically transfer lift forces is no longer used and is replaced wholly by control of the back pressure within the chambers 74B and 75B.

The lock valves 763 and 803 shown are to lock the flex and float in a fixed position to be used either when disconnecting the header from the combine and/or for transport.

The invention claimed is:

1. A crop machine comprising:
a support vehicle for running over ground;
a crop header including a crop engaging system and at least one ground engaging component for providing a supporting force from the ground as the vehicle runs over the ground so as to cause ground contact;
a support apparatus for supporting the crop header relative to the vehicle for upward and downward floating movement of the crop header so that a proportion of a supporting force to counterbalance the weight of the crop header is supplied by a lifting force from the support apparatus and a remaining portion is supplied by the ground engaging component caused by ground pressure on the ground;

the support apparatus comprising:
at least one hydraulic float cylinder having a piston movable in the cylinder arranged such that movement of the piston relative to the cylinder causes said lifting force from the support apparatus to be applied to the crop header;
a hydraulic lift system containing a hydraulic fluid under a hydraulic pressure which is set and including a fluid communication applying a force to a side of the piston in said cylinder in a direction to lift the crop header;
the hydraulic lift system in operation being arranged to provide a pressure on the piston defining a first lifting force;
a supplementary pressure system comprising a chamber and a fluid supply supplying fluid under pressure to the chamber so that the chamber applies a supplementary force to the crop header so that a combination of the first lifting force and the supplementary force provides said lifting force from the support apparatus and acts to support the header while applying said ground pressure on the ground;
and an electronic control system for controlling the lifting force from the support apparatus in response to at least one input which determines a required lifting force;
wherein the electronic control system is arranged to supply to the supplementary pressure system a control signal so as to vary the supplementary force and thereby change the lifting force from the support apparatus;
and wherein the hydraulic lift system is arranged such that the hydraulic pressure thereof is not controlled by said electronic control system when the lifting force from the support apparatus is changed.

2. The crop machine according to claim 1 wherein the hydraulic lift system is arranged such that the first lifting force is greater than the required lifting force and the supplementary force is applied in a downward direction.

3. The crop machine according to claim 1 wherein there is provided a movement sensor arranged to provide a sensor signal to said electronic control system and to instantaneously change the sensor signal in response to movement of the header in said upward and downward floating movement of the header caused by a change in said ground contact as the vehicle runs over the ground and a valve arrangement operable to provide precise, instantaneous control of the pressure of said supplementary pressure system to maintain the pressure of the hydraulic fluid in the supplementary pressure system at a value directly dependent on the control signal applied to the valve arrangement, said electronic control system being arranged instantaneously in response to said change in said sensor signal to temporarily change the control signal responsive to said change in said ground contact as the vehicle runs over the ground.

4. The crop machine according to claim 3 wherein said electronic control system is arranged subsequently in response to said sensor signal to revert to a set value of the pressure of the supplementary pressure system.

5. The crop machine according to claim 3 wherein said electronic control system is arranged in response to changes in said sensor signal to temporarily change the control signal to vary the supplementary force of the supplementary pressure system in response to detected movement of the crop header.

6. The crop machine according to claim 1 wherein the supplementary pressure system is arranged to vary pressure in a down pressure hydraulic system where hydraulic fluid from the down pressure hydraulic system is applied to the cylinder on a reverse face of the piston so as to oppose the pressure from said hydraulic system.

7. The crop machine according to claim 6 wherein movement of the piston in the cylinder, caused by the movement of the header, effects changes in the first lifting force and wherein the electronic control system is arranged to modify the control signal in response to said changes in the first lifting force caused by said movement of the piston.

8. The crop machine according to claim 1 wherein the supplementary pressure system includes a valve arrangement which has the characteristic that the valve arrangement acts to maintain the pressure of the hydraulic fluid in the chamber at a constant value, which value is dependent on the control signal applied to the valve arrangement, during changes in volume of the cylinder caused by movement of the piston.

9. The crop machine according to claim 1 wherein said electronic control system is programed to be responsive to a movement signal generated by movement of the header relative to the support vehicle and not to changes in pressure in the chamber which changes are caused by movement of the piston.

10. A crop machine comprising:
a support vehicle for running over ground;
a crop header including a crop engaging system and at least one ground engaging component for providing a supporting force from the ground as the vehicle runs over the ground so as to cause ground contact;
a support apparatus for supporting the crop header relative to the vehicle for upward and downward floating movement of the crop header so that a proportion of a supporting force to counterbalance the weight of the crop header is supplied by a lifting force from the support apparatus and a remaining portion is supplied by the ground engaging component caused by ground pressure on the ground;
the support apparatus comprising:
at least one hydraulic float cylinder having a piston movable in the cylinder arranged such that movement of the piston relative to the cylinder causes said lifting force from the support apparatus to be applied to the crop header;
a hydraulic lift system containing a hydraulic fluid under a hydraulic pressure which is set for applying a force to a side of the piston in said cylinder in a direction to lift the crop header;
the hydraulic lift system in operation being arranged to provide a hydraulic pressure defining a first lifting force;
a supplementary pressure system comprising a chamber and a fluid supply supplying fluid under pressure to the chamber so that the chamber applies a supplementary force to the crop header so that a combination of the first lifting force and the supplementary force provides said lifting force from the support apparatus and acts to support the header while applying said ground pressure on the ground;
and an electronic control system for controlling the lifting force from the support apparatus in response to at least one input which determines a required lifting force;
wherein the electronic control system is arranged to supply to the supplementary pressure system a control signal so as to vary the supplementary force;
wherein movement of the piston in the cylinder, caused by the movement of the header, effects changes in the first lifting force;

and wherein the electronic control system is arranged to modify the control signal in response to said changes in the first lifting force caused by said movement of the piston.

11. The crop machine according to claim 10 wherein the hydraulic lift system is arranged such that the first lifting force is greater than the required lifting force and the supplementary force is applied in a downward direction.

12. The crop machine according to claim 10 wherein there is provided a movement sensor arranged to provide a sensor signal to said electronic control system and to instantaneously change the sensor signal in response to movement of the header in said upward and downward floating movement of the header caused by a change in said ground contact as the vehicle runs over the ground and a valve arrangement operable to provide precise, instantaneous control of the pressure of said hydraulic fluid in said chamber to maintain the pressure of the hydraulic fluid in the chamber at a constant value directly dependent on the control signal applied to the valve arrangement, said electronic control system being arranged instantaneously in response to said change in said sensor signal to temporarily change the control signal responsive to said change in said ground contact as the vehicle runs over the ground.

13. The crop machine according to claim 10 wherein the supplementary pressure system is arranged to vary pressure in a supplementary pressure hydraulic system where hydraulic fluid from the supplementary pressure hydraulic system is applied to the cylinder on a reverse face of the piston so as to oppose the pressure from said hydraulic lift system.

14. The crop machine according to claim 10 wherein the supplementary pressure system includes a valve arrangement which has the characteristic that the valve arrangement acts to maintain the pressure of the hydraulic fluid in the chamber at a constant value, which value is dependent on the control signal applied to the valve arrangement, during changes in volume of the cylinder caused by movement of the piston.

15. The crop machine according to claim 10 wherein said electronic control system is programed to be responsive to a movement signal generated by movement of the header relative to the support vehicle and not to changes in pressure in the chamber which changes are caused by movement of the piston.

16. A crop machine comprising:
a support vehicle for running over ground;
a crop header including at least one ground engaging component for providing a supporting force from the ground as the vehicle runs over the ground so as to cause ground contact;
a support apparatus for supporting the crop header from the vehicle for upward and downward floating movement of the crop header so that a predetermined proportion of a supporting force is supplied by a lifting force from the support apparatus and a remaining portion is supplied by said at least one ground engaging component;
the crop header being supported on first and second sides of the header by first and second separate hydraulic float cylinders each on a respective side of a centerline of the crop header and each providing respective ones of first and second lifting forces from the support apparatus;
said first hydraulic float cylinder having a first lift chamber on a side of a first piston into which hydraulic fluid under pressure is applied to provide a first main lifting force;
said second hydraulic float cylinder having a second lift chamber on a side of a second piston into which hydraulic fluid under pressure is applied to provide a second main lifting force;
a first supplementary pressure system on a first side of the centerline comprising a first chamber and a first fluid supply supplying fluid under pressure to the first chamber so that the first chamber applies a first supplementary force to the crop header so that a combination of the first main lifting force and the first supplementary force provides said first lifting force and acts to support the header while applying said ground pressure on the ground;
a second supplementary pressure system on a second side of the centerline comprising a second chamber and a second fluid supply supplying fluid under pressure to the second chamber so that the second chamber applies a second supplementary force to the crop header so that a combination of the second main lifting force and the second supplementary force provides said second lifting force and acts to support the header while applying said ground pressure on the ground;
and an electronic control system for controlling the first and second lifting forces from the support apparatus in response to at least one input which determines a required lifting force;
wherein the electronic control system is arranged to supply a first control signal so as to vary the supplementary force of the first supplementary pressure system and a second control signal so as to vary the supplementary force of the second supplementary pressure system where the first control signal and the second control signal provide the capability of independently adjusting the first and second lifting forces from the support apparatus for each of said first and second sides of the header.

17. The crop machine according to claim 16 wherein the hydraulic lift system is arranged such that the first and second main lifting forces are greater than the required lifting force and the first and second supplementary forces are applied in a downward direction.

18. The crop machine according to claim 16 wherein there is provided a movement sensor arranged to provide a sensor signal to said electronic control system and to instantaneously change the sensor signal in response to movement of the header in said upward and downward floating movement of the header caused by a change in said ground contact as the vehicle runs over the ground and a valve arrangement operable to provide precise, instantaneous control of the pressure of said hydraulic fluid in at least one of the first and second chambers of the supplementary pressure systems to maintain the pressure of the hydraulic fluid in the at least one chamber at a constant value directly dependent on at least one of the first and second control signals, said electronic control system being arranged instantaneously in response to said change in said sensor signal to temporarily change the at least one control signal responsive to said change in said ground contact as the vehicle runs over the ground.

19. A crop machine comprising:
a support vehicle for running over ground;
a crop header including at least one ground engaging component for providing a supporting force from the ground as the vehicle runs over the ground so as to cause ground contact;
a support apparatus for supporting the crop header from the vehicle for upward and downward floating movement of the crop header so that a predetermined proportion of a supporting force is supplied by a lifting force from the support apparatus and a remaining portion is supplied by said at least one ground engaging component;

the crop header being supported by first and second separate hydraulic float cylinders on respective first and second sides of a centerline of the crop header;

said first hydraulic float cylinder having a first down pressure chamber on one side of a first piston into which hydraulic fluid under pressure is applied to apply a down pressure to the header in said downward floating movement;

said first hydraulic float cylinder having a first lift chamber on a side of the first piston opposite to said first down pressure chamber into which hydraulic fluid under pressure is applied to provide a first lifting force greater than a first required lifting force;

said second hydraulic float cylinder having a second down pressure chamber on one side of a second piston into which hydraulic fluid under pressure is applied to apply a down pressure to the header in said downward floating movement;

said second hydraulic float cylinder having a second lift chamber on a side of the second piston opposite to said second down pressure chamber into which hydraulic fluid under pressure is applied to provide a second lifting force greater than a second required lifting force;

and an electronic control system for controlling the first and second lifting forces from the support apparatus in response to at least one input which determines said first and second required lifting forces;

wherein the electronic control system is arranged to supply a first control signal so as to vary the down pressure of the first down pressure chamber and a second control signal so as to vary the down pressure of the second down pressure chamber where the first control signal and the second control signal provide the capability of independently adjusting the lifting force from the support apparatus for each of said first and second sides of the crop header.

20. The crop machine according to claim 19 wherein there is provided a movement sensor arranged to provide a sensor signal to said electronic control system and to instantaneously change the sensor signal in response to movement of the header in said upward and downward floating movement of the header caused by a change in said ground contact as the vehicle runs over the ground and a valve arrangement operable to provide precise, instantaneous control of the pressure of said hydraulic fluid in at least one of said first and second down pressure chambers to maintain the pressure of the hydraulic fluid in the at least one down pressure chamber at a constant value directly dependent on at least one of the first and second control signals, said electronic control system being arranged instantaneously in response to said change in said sensor signal to temporarily change the at least one control signal responsive to said change in said ground contact as the vehicle runs over the ground.

21. A crop machine comprising:
a support vehicle for running over ground;
a crop header including at least one ground engaging component for providing a supporting force from the ground as the vehicle runs over the ground so as to cause ground contact;
a support apparatus for supporting the crop header from the vehicle for upward and downward floating movement of the crop header so that a predetermined proportion of a supporting force is supplied by a lifting force from the support apparatus and a remaining portion is supplied by said at least one ground engaging component;

the crop header being supported on first and second sides of the header by first and second separate hydraulic float cylinders each on a respective side of a centerline of the crop header and each providing respective ones of first and second lifting forces from the support apparatus;

said first hydraulic float cylinder having a first lift chamber on a side of a first piston into which hydraulic fluid under pressure is applied to provide a first main lifting force;

said second hydraulic float cylinder having a second lift chamber on a side of a second piston into which hydraulic fluid under pressure is applied to provide a second main lifting force;

a first supplementary pressure system on a first side of the centerline comprising a first chamber and a first fluid supply supplying fluid under pressure to the first chamber so that the first chamber applies a first supplementary force to the crop header so that a combination of the first main lifting force and the first supplementary force provides said first lifting force from the support apparatus and acts to support the header while applying said ground pressure on the ground;

a second supplementary pressure system on a second side of the centerline comprising a second chamber and a second fluid supply supplying fluid under pressure to the second chamber so that the second chamber applies a supplementary force to the crop header so that a combination of the second main lifting force and the second supplementary force provides said second lifting force from the support apparatus and acts to support the header while applying said ground pressure on the ground;

and an electronic control system for controlling the first and second lifting forces from the support apparatus in response to at least one input which determines a required lifting force;

wherein the electronic control system is arranged, in order to change the first lifting force, to supply a first control signal so as to vary the supplementary force of the first supplementary pressure system to change the first lifting force from the support apparatus, while the first hydraulic float cylinder and the electronic control systems are arranged such that the hydraulic pressure of the first hydraulic float cylinder is not controlled by said electronic control system when the first lifting force is changed;

and wherein the electronic control system is arranged, in order to change the second lifting force, to supply a second control signal so as to vary the supplementary force of the second supplementary pressure system to change the second lifting force from the support apparatus, while the second hydraulic float cylinder and the electronic control systems are arranged such that the hydraulic pressure of the second hydraulic float cylinder is not controlled by said electronic control system when the second lifting force is changed.

22. The crop machine according to claim 21 wherein there is provided a movement sensor arranged to provide a sensor signal to said electronic control system and to instantaneously change the sensor signal in response to movement of the header in said upward and downward floating movement of the header caused by a change in said ground contact as the vehicle runs over the ground and a valve arrangement operable to provide precise, instantaneous control of the pressure in at least one of the first and second supplementary pressure systems to maintain the pressure of the hydraulic fluid in the at least one supplementary pressure system at a value directly dependent on at least one of the first and second control signals, said electronic control system being arranged instantaneously in response to said change in said sensor signal to temporarily change the at least one control signal responsive to said change in said ground contact as the vehicle runs over the ground.

23. A crop machine comprising:
   a support vehicle for running over ground;
   a crop header including at least one ground engaging component for providing a supporting force from the ground as the vehicle runs over the ground so as to cause ground contact;
   a support apparatus for supporting the crop header from the vehicle for upward and downward floating movement of the crop header so that a predetermined proportion of a supporting force is supplied by a lifting force from the support apparatus and a remaining portion is supplied by said at least one ground engaging component;
   the crop header being supported on first and second sides of the header by first and second separate hydraulic float cylinders each on a respective side of a centerline of the crop header and each providing respective ones of first and second lifting forces;
   said first hydraulic float cylinder having a first down pressure chamber on one side of a first piston into which hydraulic fluid under pressure is applied to apply a first down pressure to the header in said downward floating movement;
   said first hydraulic float cylinder having a first lift chamber on a side of the first piston opposite to said first down pressure chamber into which hydraulic fluid under pressure is applied to provide a first lifting force, where the first hydraulic float cylinder provides a first total lifting force which is a combination of the first down pressure and the first lifting force;
   said second hydraulic float cylinder having a second down pressure chamber on one side of a second piston into which hydraulic fluid under pressure is applied to apply a second down pressure to the header in said downward floating movement;
   said second hydraulic float cylinder having a second lift chamber on a side of the first piston opposite to said second down pressure chamber into which hydraulic fluid under pressure is applied to provide a second lifting force, where the second hydraulic float cylinder provides a second total lifting force which is a combination of the second down pressure and the second lifting force;
   and an electronic control system for controlling the first and second total lifting forces from the support apparatus in response to at least one input which determine a required lifting force;
   wherein the electronic control system is arranged, in order to change the first total lifting force, to supply a first control signal so as to vary the hydraulic pressure in the first down pressure chamber to change the first total lifting force, while the first hydraulic float cylinder and the electronic control systems are arranged such that the hydraulic pressure in the first lift chamber is not controlled by said electronic control system when the first total lifting force is changed;
   and wherein the electronic control system is arranged, in order to change the second total lifting force, to supply a second control signal so as to vary the hydraulic pressure in the second down pressure chamber to change the second total lifting force, while the second hydraulic float cylinder and the electronic control systems are arranged such that the hydraulic pressure in the second lift chamber is not controlled by said electronic control system when the second total lifting force is changed.

24. The crop machine according to claim 23 wherein there is provided a movement sensor arranged to provide a sensor signal to said electronic control system and to instantaneously change the sensor signal in response to movement of the header in said upward and downward floating movement of the header caused by a change in said ground contact as the vehicle runs over the ground and a valve arrangement operable to provide precise, instantaneous control of the pressure in at least one of the first and second down pressure chambers to maintain the pressure of the hydraulic fluid in the at least one down pressure chamber at a value directly dependent on at least one of the first and second control signals, said electronic control system being arranged instantaneously in response to said change in said sensor signal to temporarily change the at least one control signal responsive to said change in said ground contact as the vehicle runs over the ground.

* * * * *